US008928633B2

(12) United States Patent
Misawa et al.

(10) Patent No.: US 8,928,633 B2
(45) Date of Patent: Jan. 6, 2015

(54) INFORMATION PROCESSING SYSTEM AND ELECTRONIC PEN

(75) Inventors: Junichiro Misawa, Nagano (JP); Yoshio Ito, Tochigi (JP); Yasushi Itoshiro, Nagano (JP)

(73) Assignee: Sony Corporation, Tokyo (JP)

( * ) Notice: Subject to any disclaimer, the term of this patent is extended or adjusted under 35 U.S.C. 154(b) by 1070 days.

(21) Appl. No.: 12/903,604

(22) Filed: Oct. 13, 2010

(65) Prior Publication Data

US 2011/0141067 A1 Jun. 16, 2011

(30) Foreign Application Priority Data

Dec. 14, 2009 (JP) ................................ 2009-283184

(51) Int. Cl.
G06F 3/033 (2013.01)
G06F 3/0354 (2013.01)
G06F 3/03 (2006.01)
G06F 3/043 (2006.01)
G06F 17/24 (2006.01)

(52) U.S. Cl.
CPC .......... *G06F 3/03545* (2013.01); *G06F 3/0304* (2013.01); *G06F 3/043* (2013.01); *G06F 17/242* (2013.01)
USPC ........................................................ 345/179

(58) Field of Classification Search
USPC .................................. 345/179–183
See application file for complete search history.

(56) References Cited

U.S. PATENT DOCUMENTS 5,736,980 A * 4/1998 Iguchi et al. .................. 345/179
2004/0212617 A1* 10/2004 Fitzmaurice et al. ......... 345/440
2010/0021022 A1* 1/2010 Pittel et al. .................... 382/123

FOREIGN PATENT DOCUMENTS

JP 2007-122659 5/2007
JP 2008-217179 9/2008

OTHER PUBLICATIONS

U.S. Appl. No. 13/024,440, filed Feb. 10, 2011, Misawa, et al.

* cited by examiner

*Primary Examiner* — Yong H Sim
(74) *Attorney, Agent, or Firm* — Oblon, Spivak, McClelland, Maier & Neustadt, L.L.P.

(57) ABSTRACT

An information processing system includes an electronic pen, a position detection unit configured to detect the position of a pen tip of the electronic pen and to acquire positional information indicating the position of the pen tip of the electronic pen, a modification ID storage unit configured to store a modification ID for identifying modification of the position indicated by the positional information, a modification ID updating unit configured to update the modification ID, and a reception device including a storage unit and a registration processing unit configured to register the modification ID stored by the modification ID storage unit and the positional information acquired by the position detection unit in the storage unit as associated information.

15 Claims, 28 Drawing Sheets

FIG. 27

EXAMPLE OF HANDWRITING

「MARKING」IS PERFORMED USING PEN WITH RESPECT TO PORTION IN WHICH COLOR IS DESIRED TO BE CHANGED. MARKING IS DETECTED BY SOFTWARE ON「PC」WHEN BEING INPUT TO「PC」 AND COLOR OF(MARKED)AREA IS CHANGED AND DISPLAYED ON SCREEN.

⇨

CHECK RANGE INPUT TO PC

「MARKING」IS PERFORMED USING PEN WITH RESPECT TO PORTION IN WHICH COLOR IS DESIRED TO BE CHANGED. MARKING IS DETECTED BY SOFTWARE ON「PC」WHEN BEING INPUT TO「」 AND COLOR OF()AREA IS CHANGED AND DISPLAYED ON SCREEN.

⇨

DISPLAY ON PC SCREEN

IS PERFORMED USING PEN WITH RESPECT TO PORTION IN WHICH COLOR IS DESIRED TO BE CHANGED. MARKING IS DETECTED BY SOFTWARE ON     WHEN BEING INPUT TO AND COLOR OF          AREA IS CHANGED AND DISPLAYED ON SCREEN.

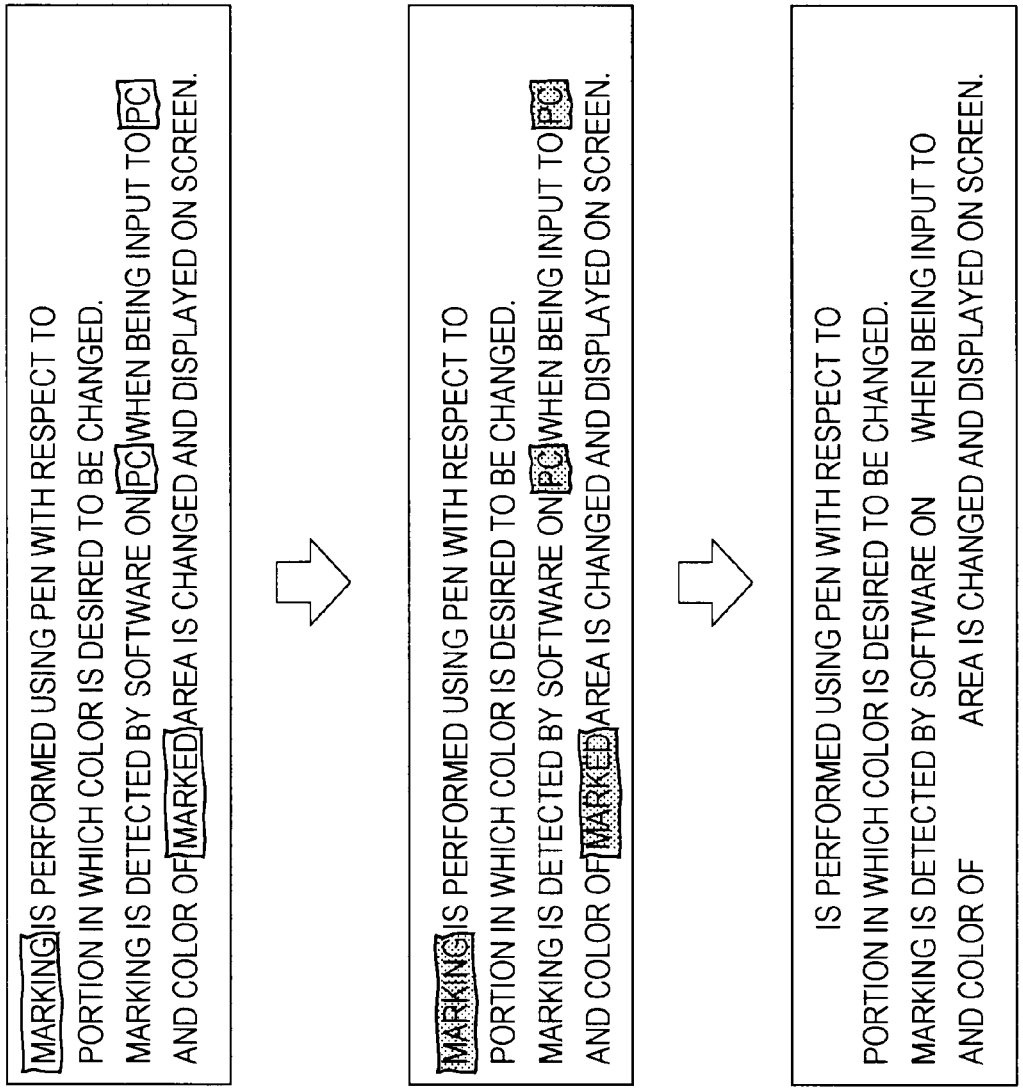

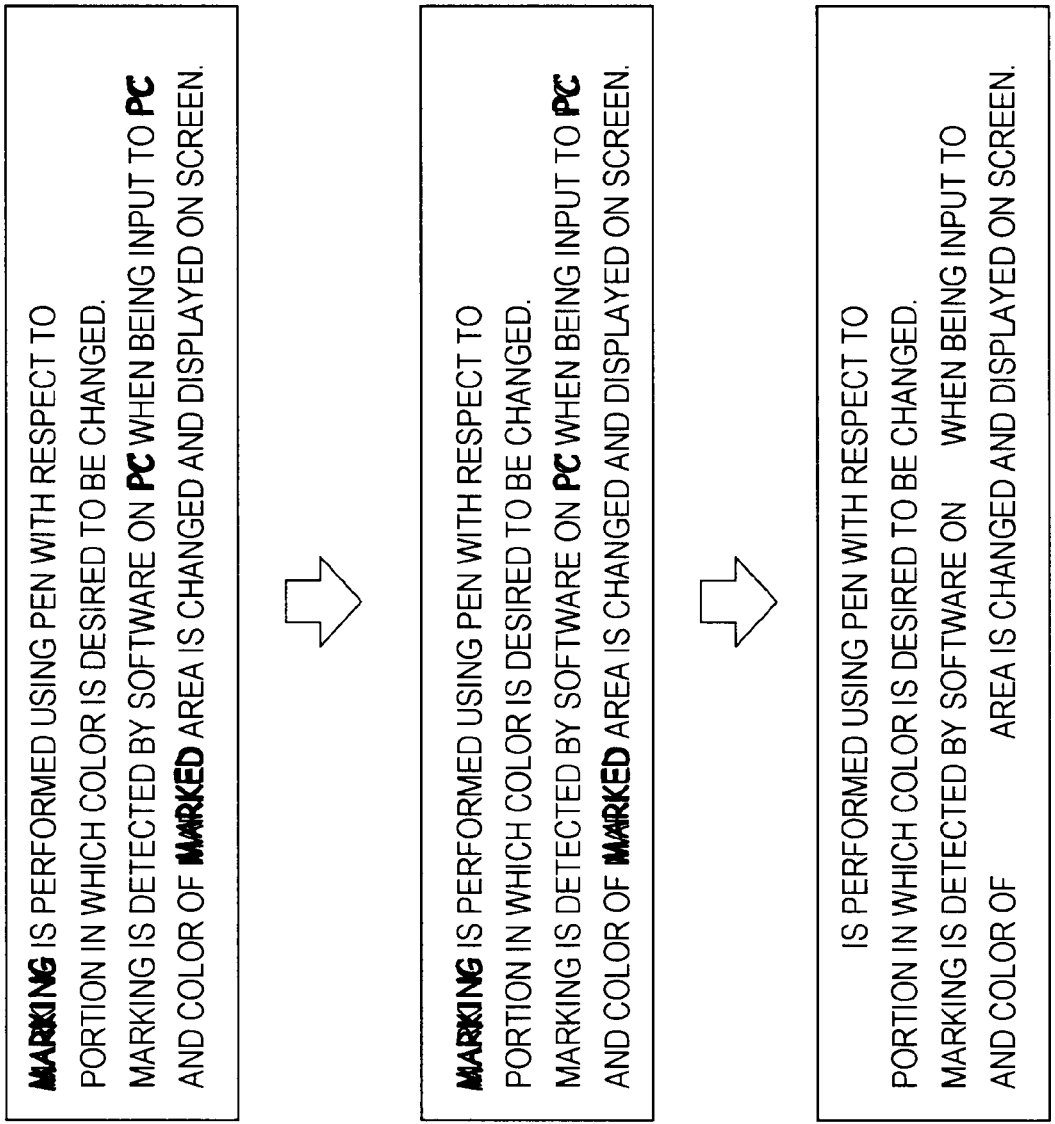

INFORMATION PROCESSING SYSTEM AND ELECTRONIC PEN

BACKGROUND OF THE INVENTION

1. Field of the Invention

The present invention relates to an information processing system and an electronic pen.

2. Description of the Related Art

Recently, various methods are used as an electronic pen capable of inputting handwriting data. As the methods of the electronic pen, for example, there is an electromagnetic induction method, a resistance film method, an infrared/ultrasonic method, the Anoto method (registered trademark), or the like. As technology for the electronic pen, various technologies are disclosed, but, for example, technology of enabling an electronic pen using an infrared/ultrasonic method as an auxiliary input device, such as a joystick or a mouse, without being replaced by a user is disclosed (for example, see Japanese Unexamined Patent Application Publication 2007-122659).

However, when a user inputs handwriting data using an electronic pen, there is a situation where the color of the handwriting data is changed or the handwriting data is erased. In this case, for example, it is necessary for the user to input the handwriting data with the electronic pen to a Personal Computer (PC) and perform an operation for changing the color of the handwriting data or erasing the handwriting data using an input device such as a mouse while displaying the handwriting data on a display. In addition, hereinafter, there are cases where changing information indicating attributes of handwriting data, such as changing the color of the handwriting data or erasing the handwriting data, may be merely referred to as "modifying handwriting data". As described below, an operation for "modifying handwriting data" may be an operation other than an operation for changing the information indicating the attributes of the handwriting data.

SUMMARY OF THE INVENTION

However, in the technology in which the user performs the operation for modifying the handwriting data using the input device such as the mouse while displaying the handwriting data on the display, the user may not modify the handwriting data in a step of inputting the handwriting data. That is, for example, even when the user wants to modify the handwriting data in the step of inputting the handwriting data, it is necessary that the actual modifying operation be performed after the handwriting data is input to the PC. To this end, the user reminds themselves of the modification of the handwriting data, which is determined by the user in the step of inputting the handwriting data, after the handwriting data is input to the PC and thus there is a problem of imposing a burden on the user.

It is desirable to provide a novel and improved technology capable of modifying handwriting data at a step in which a user inputs handwriting data using an electronic pen.

According to an embodiment of the present invention, there is provided an information processing system including: an electronic pen; a position detection unit configured to detect the position of a pen tip of the electronic pen and to acquire positional information indicating the position of the pen tip of the electronic pen; a modification ID storage unit configured to store a modification ID for identifying modification of the position indicated by the positional information; a modification ID updating unit configured to update the modification ID; and a reception device including a storage unit and a registration processing unit configured to register the modification ID stored by the modification ID storage unit and the positional information acquired by the position detection unit in the storage unit as associated information.

The modification ID storage unit and the modification ID updating unit may be included in the electronic pen. When a button provided on a surface of the electronic pen is included and the button is pressed by a user, the modification ID updating unit may update the modification ID by an ID corresponding to the pressed button. When a slide provided on a surface of the electronic pen is included and the slide is moved by a user, the modification ID updating unit may update the modification ID by an ID corresponding to a position to which the slide is adjusted after movement.

When a rotation adjustment unit rotated by twisting the electronic pen is included and the rotation adjustment unit is rotated by a user, the modification ID updating unit may update the modification ID by an ID corresponding to a position to which the rotation adjustment unit is adjusted after rotation. The modification of the position indicated by the positional information may indicate a color used to color the position when the position indicated by the positional information is displayed on a display or is printed on paper. The modification ID storage unit and the modification ID updating unit may be included in the reception device.

The information processing system may further include a position determination unit configured to analyze the positional information acquired by the position detection unit and to enable the modification ID updating unit to update the modification ID stored by the modification ID storage unit by an ID corresponding to the predetermined partition if it is determined that the positional information indicates a position in a predetermined partition.

When a pressure sensor provided on an end opposite to the pen tip of the electronic pen is included and pressure is detected by the pressure sensor, the modification ID updating unit may update the modification ID by an ID corresponding to the end opposite to the pen tip of the electronic pen, and the position detection unit may detect the position of the end opposite to the pen tip of the electronic pen and acquire the positional information indicating the position of the end opposite to the pen tip of the electronic pen as the positional information.

The position detection unit may be included in the electronic pen. In addition, the position detection unit may be included in the reception device.

As described above, according to the embodiments of the present invention, it is possible to modify handwriting data in a step in which a user inputs handwriting data using an electronic pen.

BRIEF DESCRIPTION OF THE DRAWINGS

FIG. 27 is a diagram illustrating a step (method 1) of erasing handwriting data by an information processing device according to a fifth embodiment of the present invention;

FIG. 28 is a diagram illustrating a step (method 2) of erasing handwriting data by an information processing device according to the same embodiment;

FIG. 29 is a diagram illustrating a step (method 3) of erasing handwriting data by an information processing device according to the same embodiment.

DESCRIPTION OF THE PREFERRED EMBODIMENTS

Figure 1:
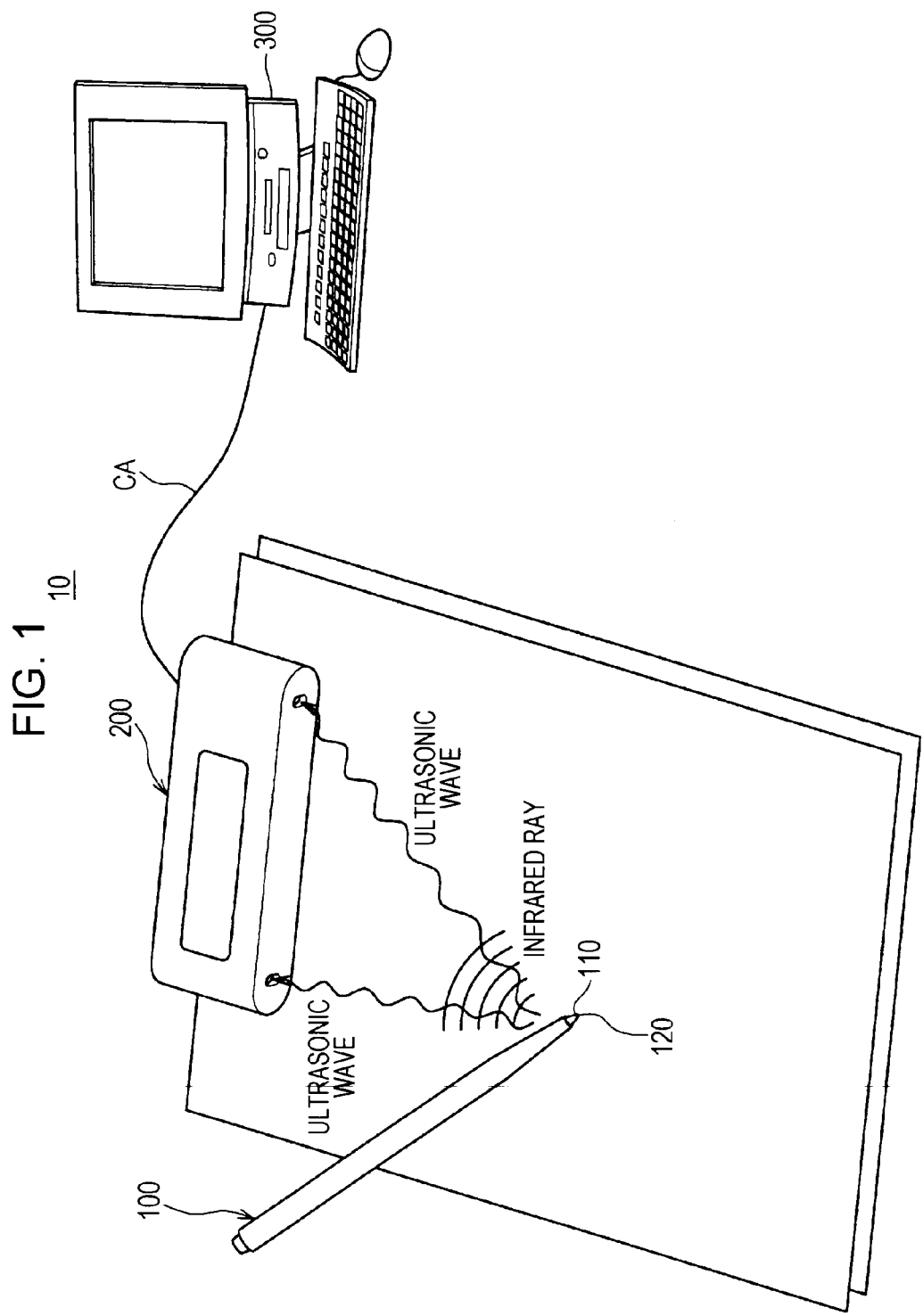
FIG. 1 is a diagram showing the configuration of an information processing system according to a first embodiment of the present invention.

Hereinafter, exemplary embodiments of the present invention will be described in detail with reference to the accompanying drawings. In addition, in the present specification and drawings, components having substantially the same functions are denoted by the same reference numerals and the repeated description will be omitted.

The description will be given in the following order.
1. First Embodiment (Case where Electronic Pen or Reception Device Changes Color of Handwriting Data)
1-1. Configuration of Information Processing System
1-2. Example of Principle of Detecting Position of Electronic Pen
1-3. Case where Buttons for Changing Color are Provided on Electronic Pen
1-4. Case where Slide for Changing Color is Provided on Electronic Pen
1-5. Case where Rotation Adjustment Unit for Changing Color is Provided on Electronic Pen
1-6. Case where Buttons for Changing Color is Provided on Receiver
1-7. Case where Slide for Changing Color is Provided on Receiver
1-8. Functional Configuration of Electronic Pen
1-9. Functional Configuration of Receiver 1-10. Functional Configuration of Information Processing Device
1-11. Process Executed by Electronic Pen in the case where Buttons are Present on Electronic Pen
1-12. Process Executed by Receiver in the Case where Buttons are Present on Electronic Pen
2. Second Embodiment (Case of using Dedicated Paper in which Partitions for Specifying Colors are Arranged)
2-1. Functional Configuration of Receiver
2-2. Example of using Receiver in case of using Dedicated Paper
2-3. Process Executed by Receiver
3. Third Embodiment (Case where Information Processing Device changes Color of Handwriting Data)
3-1. Functional Configuration of Information Processing Device
3-2. Method of Changing Color of Handwriting Data by Information Processing Device
3-3. Step of Changing Color of Handwriting Data by Information Processing Device
3-4. Process Executed by Information Processing Device
4. Fourth Embodiment (Case where Electronic Pen or Reception Device Erases Handwriting Data)
4-1. Case where Eraser for Erasing Handwriting Data is Provided on Electronic Pen
4-2. Case where Eraser for Erasing Handwriting Data is Provided on Stick
4-3. Case where Slide for Erasing Handwriting Data is Provided on Electronic Pen
4-4. Case where Buttons for Erasing Handwriting Data are Provided on Receiver
4-5. Case where Slide for Erasing Handwriting Data is Provided on Receiver
4-6. Process Executed by Electronic Pen in the case where Eraser is Present on Electronic Pen
4-7. Process Executed by Receiver in the Case where Eraser is Present on Electronic Pen
5. Fifth Embodiment (Case where Information Processing Device Erases Handwriting Data)
5-1. Step of Erasing Handwriting Data by Information Processing Device (Method 1)
5-2. Step of Erasing Handwriting Data by Information Processing Device (Method 2)
5-3. Step of Erasing Handwriting Data by Information Processing Device (Method 3)
5-4. Process Executed by Information Processing Device
6. Modified Example
7. Overview 1. First Embodiment Case where Electronic Pen or Reception Device Changes Color of Handwriting Data First, a first embodiment of the present invention will be described. In the first embodiment of the present invention, an electronic pen or a reception device configuring an information processing system changes the color of handwriting data.
1-1. Configuration of Information Processing System
FIG. 1 is a diagram showing the configuration of an information processing system according to a first embodiment of the present invention. Referring to FIG. 1, the configuration of the information processing system according to the same embodiment will be described. In the first embodiment, the electronic pen or the reception device has the configuration for changing the color of the handwriting data.

As shown in FIG. 1, the information processing system 10 according to the first embodiment of the present invention includes at least an electronic pen 100 for receiving an input of handwriting data and a receiver 200 for storing handwriting data in association with a modification ID. The receiver 200 functions as an example of a reception device. In addition, as described above, changing information indicating attributes of handwriting data, such as changing the color of the handwriting data or erasing the handwriting data, is merely referred to as "modifying handwriting data", and the modification ID is to identify the kind of modification of handwriting data. In addition, an operation for "modifying handwriting data" may be an operation other than an operation for changing the information indicating the attributes of the handwriting data, for example, an operation for changing attributes (color or the like) of a background of a predetermined portion (a portion desired to be changed which is specified by a user). In addition, the operation may be an operation for inserting a drawing into a predetermined portion. In addition, the information processing system 10 may further include an information processing device 300. The information processing device 300 is, for example, connected to the receiver 200 by a cable CA to perform a process of displaying handwriting data acquired from the receiver 200.

When a user performs handwriting using the electronic pen 100 with respect to paper, the position of the electronic pen 100 is detected by the electronic pen 100 or the receiver 200, and the detected position is acquired as positional information and is finally displayed on the information processing device 300 as handwriting data. As described above, a method of detecting the position of the electronic pen 100 includes various methods, such as an electromagnetic induction method, a resistance film method, an infrared/ultrasonic method, the Anoto method (registered trademark), and the like, and, although not specially limited, in the present embodiment, in particular, the case where the infrared/ultrasonic method is used will be described. In the infrared/ultrasonic method, for example, a transmission device 110 is included in a pen tip of the electronic pen 100, and, when the receiver 200 receives infrared rays and ultrasonic waves transmitted from the transmission device 110, the receiver 200 detects the position of the electronic pen 100 based on the received infrared rays and the ultrasonic waves. The principle of the infrared/ultrasonic method will be described in detail using FIG. 2.

The position of the electronic pen 100 may be constantly detected or detected at each predetermined period. That is, for example, the infrared rays and the ultrasonic waves may be constantly transmitted or may be transmitted at each predetermined period. The position of the electronic pen 100 may be detected only while a user performs handwriting. For example, a pressure sensor may be included in the pen tip of the electronic pen 100, and, when the pressure sensor detects pressure generated by pressing the pen tip while the user performs handwriting, the infrared rays and the ultrasonic waves are transmitted from the transmission device 110 and the receiver 200 may detect the position of the electronic pen 100 when the infrared rays and the ultrasonic waves are received.

In addition, in the present embodiment, an ink is filled in the electronic pen 100, and, when the user performs handwriting using the electronic pen 100 with respect to paper, the ink filled in the electronic pen 100 may be attached to a handwriting trace. In this way, the user may check handwriting on paper.

1-2. Example of Principle of Detecting Position of Electronic Pen

Figure 2:
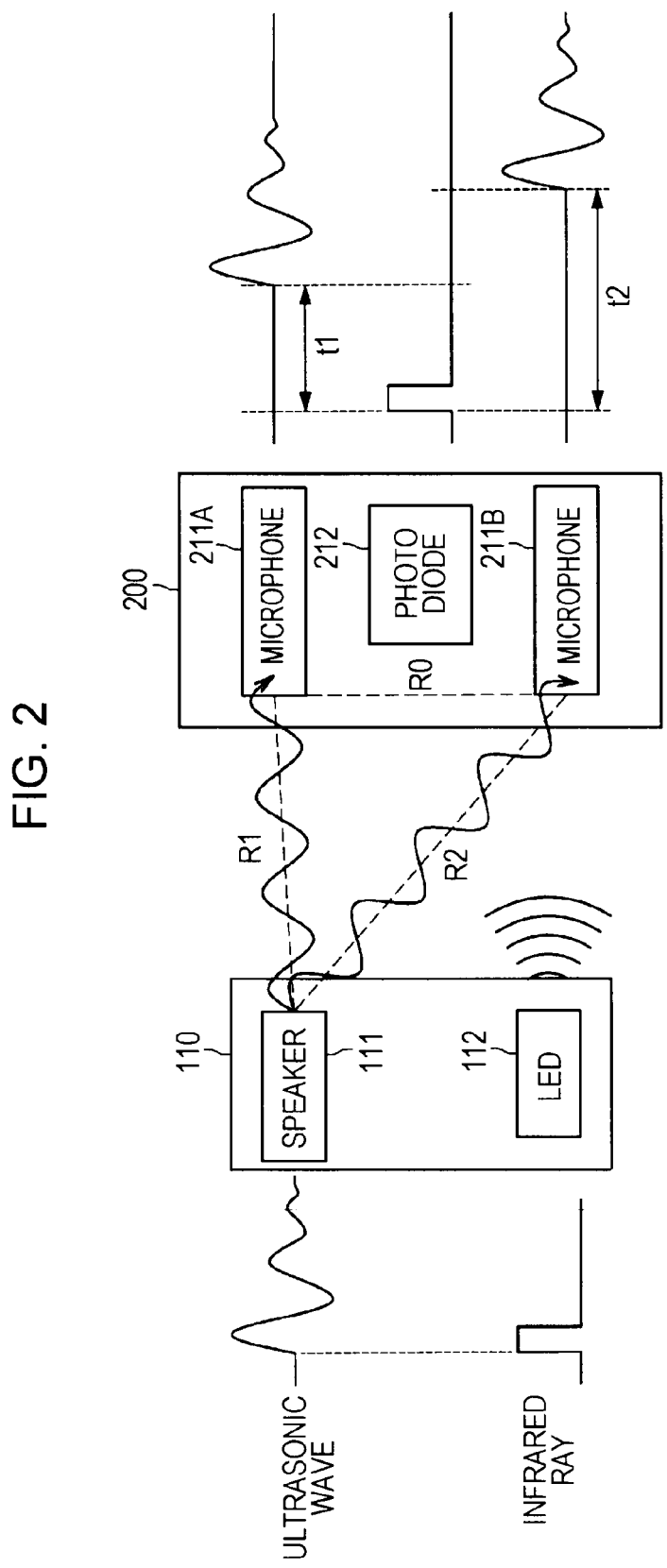
FIG. 2 is a diagram illustrating an example of a principle of detecting the position of an electronic pen according to the same embodiment.

FIG. 2 is a diagram illustrating an example of a principle of detecting the position of an electronic pen according to the first embodiment of the present invention. The example of a principle of detecting the position of the electronic pen according to the same embodiment will be described with reference to FIG. 2.

As shown in FIG. 2, in the transmission device 110 of the electronic pen 100, a speaker 111 and a Light Emitting Diode (LED) 112 are included. The ultrasonic waves from the speaker 111 and the infrared rays from the LED 112 are substantially simultaneously transmitted. In the receiver 200, a microphone 211A, a microphone 211B, and a photodiode 212 are included. The photodiode 212 receives the infrared rays transmitted from the LED 112 and the microphone 211A and the microphone 211B receive the ultrasonic waves transmitted from the speaker 111. At this time, the receiver 200 detects the position of the transmission device 110, that is, the position of the electronic pen 100, based on a time when the ultrasonic waves are received by the microphone 211A, a time when the ultrasonic waves are received by the microphone 211B, and a time when the infrared rays are received by the photodiode 212. When the position of the electronic pen 100 is detected by the receiver 200, the positional information of the electronic pen 100 is, for example, acquired as xy coordinates. The receiver 200 records, for example, the acquired positional information in a flash memory mounted in the receiver 200 or the like.

In greater detail, a distance R0 between the microphone 211A and the microphone 211B is constant and is already stored by the receiver 200. In addition, the receiver 200 calculates a distance R1 based on an elapsed time t1 from when the infrared rays are received by the photodiode 212 to when the ultrasonic waves are received by the microphone 211A. Similarly, the receiver 200 calculates a distance R2 based on an elapsed time t2 from when the infrared rays are received by the photodiode 212 to when the ultrasonic waves are received by the microphone 211B. The receiver 200 detects the position of the electronic pen 100 based on the distance R0, the distance R1 and the distance R2. The above description is the example of the principle of detecting the position of the electronic pen.

1-3. Case where Buttons for Changing Color are Provided on Electronic Pen

Figure 3:
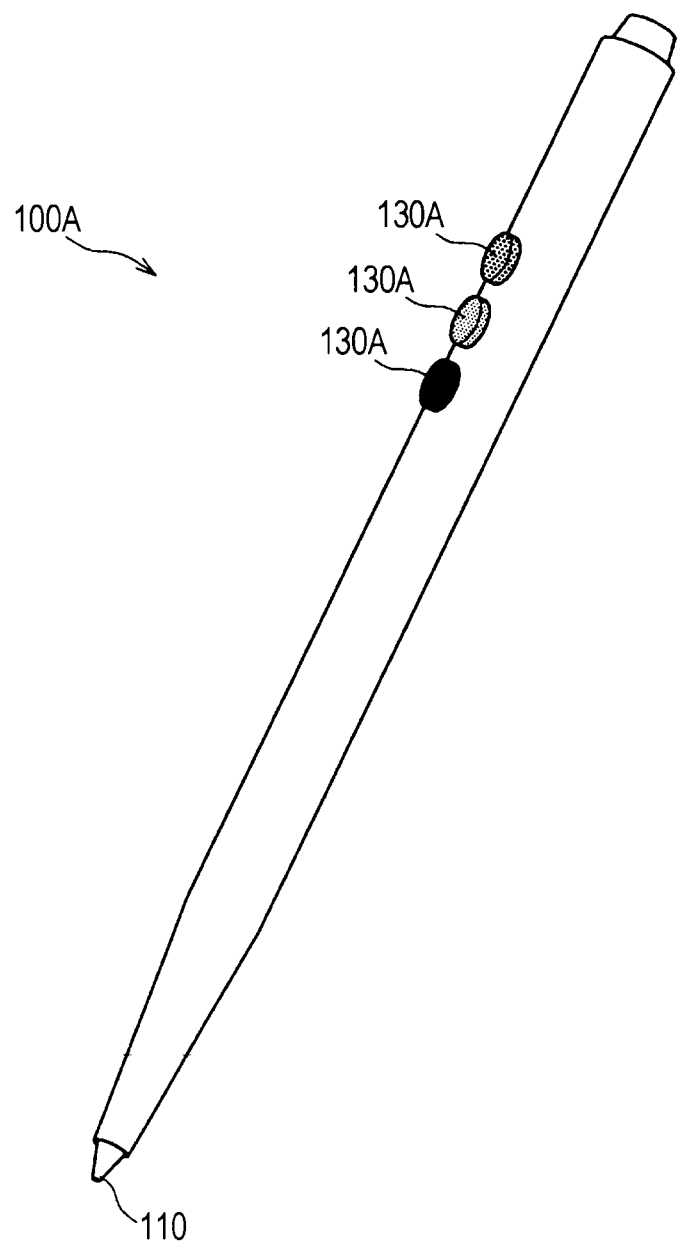
FIG. 3 is a diagram showing the overview of an electronic pen, in which buttons configuring a modification ID updating unit (a component for changing the color of handwriting data) are provided on a surface thereof, according to the same embodiment.

FIG. 3 is a diagram showing the overview of an electronic pen, in which buttons configuring a modification ID updating unit (a component for changing the color of handwriting data) are provided on a surface thereof, according to the first embodiment of the present invention. The electronic pen, in which the buttons configuring the modification ID updating unit (the component for changing the color of handwriting data) are provided on the surface thereof, according to the same embodiment, will be described with reference to FIG. 3.

As shown in FIG. 3, for example, as an example of the component for changing the color of the handwriting data, buttons 130A are included in an electronic pen 100A. Although, in the example shown in FIG. 3, three buttons 130A are included in the electronic pen 100A, the number of buttons 130A is not specially limited thereto. Each button 130A may be, for example, separately prepared with respect to each color as shown in FIG. 3, and a modification ID stored in a modification ID storage unit (a flash memory mounted in the electronic pen 100 or the like) may be updated by a color ID corresponding to a button 130A pressed by the user. Alternatively, whenever the button 130A is pressed by the user, the modification ID stored in the modification ID storage unit may be cyclically updated by a different color ID.

1-4. Case where Slide for Changing Color is Provided on Electronic Pen

Figure 4:
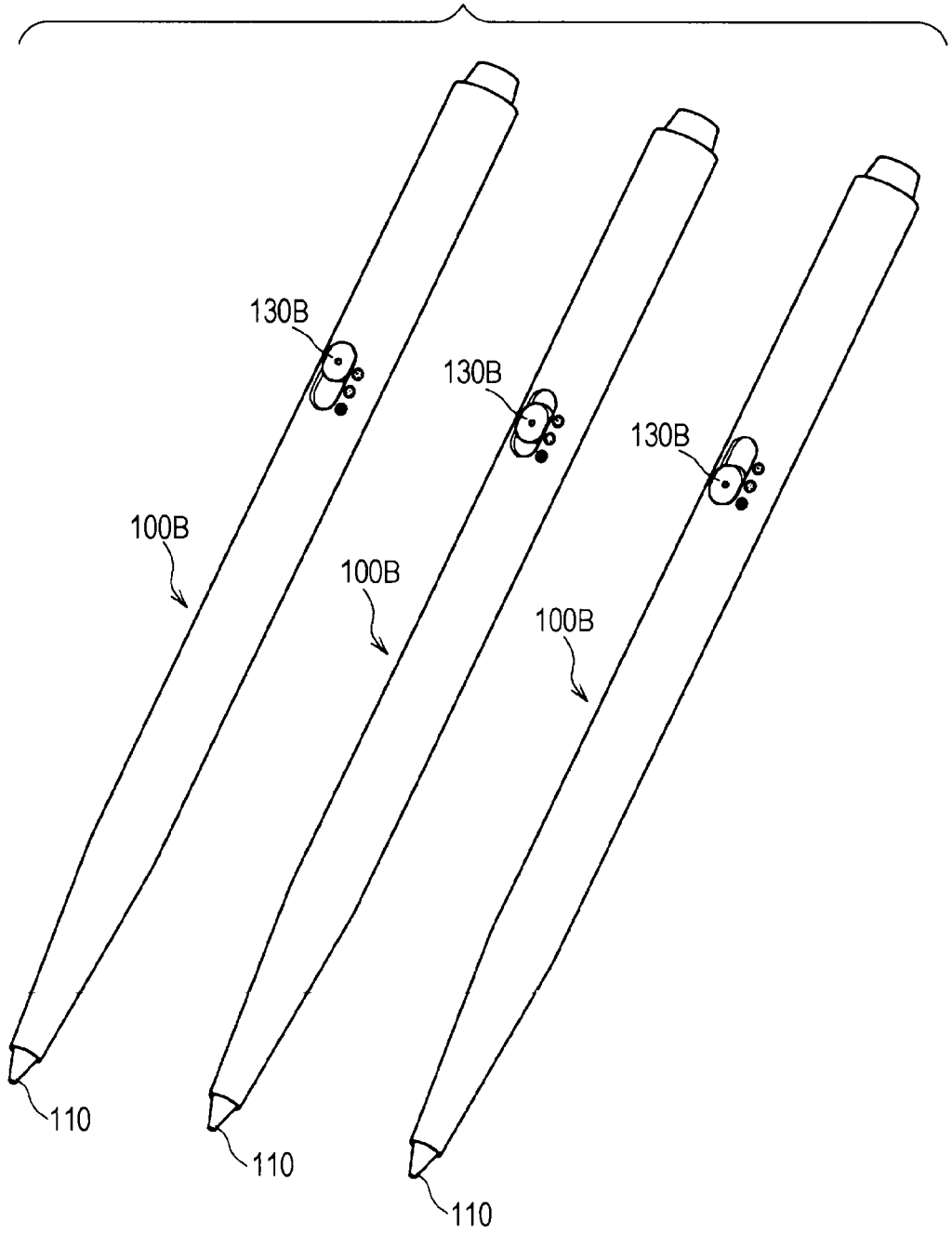
FIG. 4 is a diagram showing the overview of an electronic pen, in which a slide configuring a modification ID updating

FIG. 4 is a diagram showing the overview of an electronic pen, in which a slide configuring a modification ID updating unit (a component for changing the color of handwriting data) is provided on a surface thereof, according to the first embodiment of the present invention. The electronic pen, in which the slide configuring the modification ID updating unit (the component for changing the color of handwriting data) is provided on the surface thereof, according to the same embodiment, will be described with reference to FIG. 4.

As shown in FIG. 4, for example, as an example of the component for changing the color of the handwriting data, a slide 130B is included in an electronic pen 100B. In the slide 130B, for example, as shown in FIG. 4, an indicator corresponding to each color is prepared so as to select a color, and a modification ID stored in a modification ID storage unit (a flash memory mounted in the electronic pen 100 or the like) is updated by a color ID corresponding to an indicator to which the slide 130B is matched by user.

Figure 5:
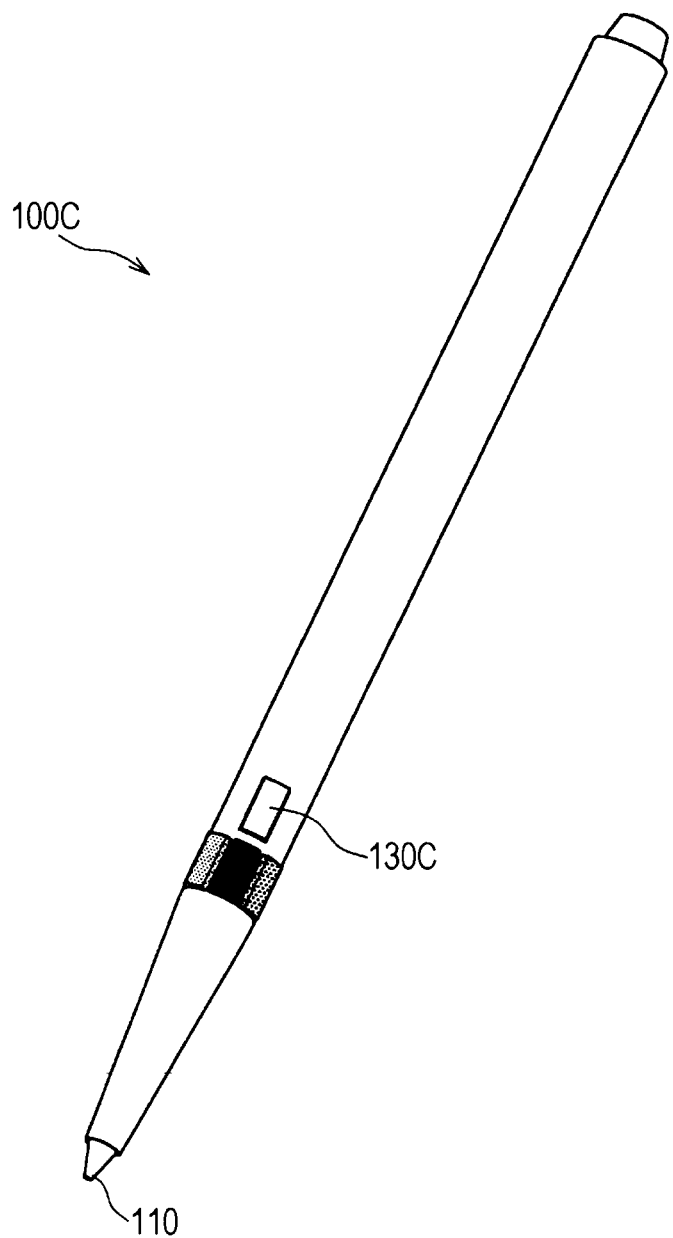
FIG. 5 is a diagram showing the overview of an electronic pen, in which a rotation adjustment unit configuring a modification ID updating unit (a component for changing the color of handwriting data) is provided, according to the same embodiment.

1-5. Case where Rotation Adjustment Unit for Changing Color is Provided on Electronic Pen FIG. 5 is a diagram showing the overview of an electronic pen, in which a rotation adjustment unit configuring a modification ID updating unit (a component for changing the color of handwriting data) is provided, according to the first embodiment of the present invention. The electronic pen, in which the rotation adjustment unit configuring the modification ID updating unit (the component for changing the color of handwriting data) is provided, according to the same embodiment will be described with reference to FIG. 5.

As shown in FIG. 5, for example, as an example of the component for changing the color of the handwriting data, a rotation adjustment unit 130C is included in an electronic pen 100C. In the rotation adjustment unit 130C, for example, as shown in FIG. 5, an indicator corresponding to each color is prepared so as to select a color, and a modification ID stored in a modification ID storage unit (a flash memory mounted in the electronic pen 100 or the like) is updated by a color ID corresponding to an indicator, matched by rotating the rotation adjustment unit 130C by user.

1-6. Case where Buttons for Changing Color are Provided on Receiver

Figure 6:
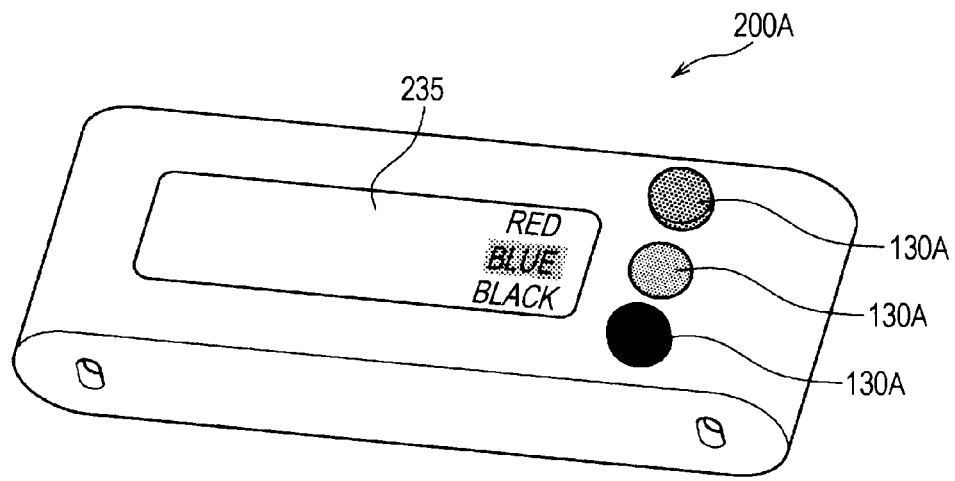
FIG. 6 is a diagram showing the overview of a receiver, in which buttons configuring a modification ID updating unit (a component for changing the color of handwriting data) are provided on a surface thereof, according to the same embodiment.

FIG. 6 is a diagram showing the overview of a receiver, in which buttons configuring a modification ID updating unit (a component for changing the color of handwriting data) is provided on a surface thereof, according to the first embodiment of the present invention. The receiver, in which the buttons configuring the modification ID updating unit (the component for changing the color of handwriting data) are provided on a surface thereof, according to the same embodiment, will be described with reference to FIG. 6.

Figure 8:
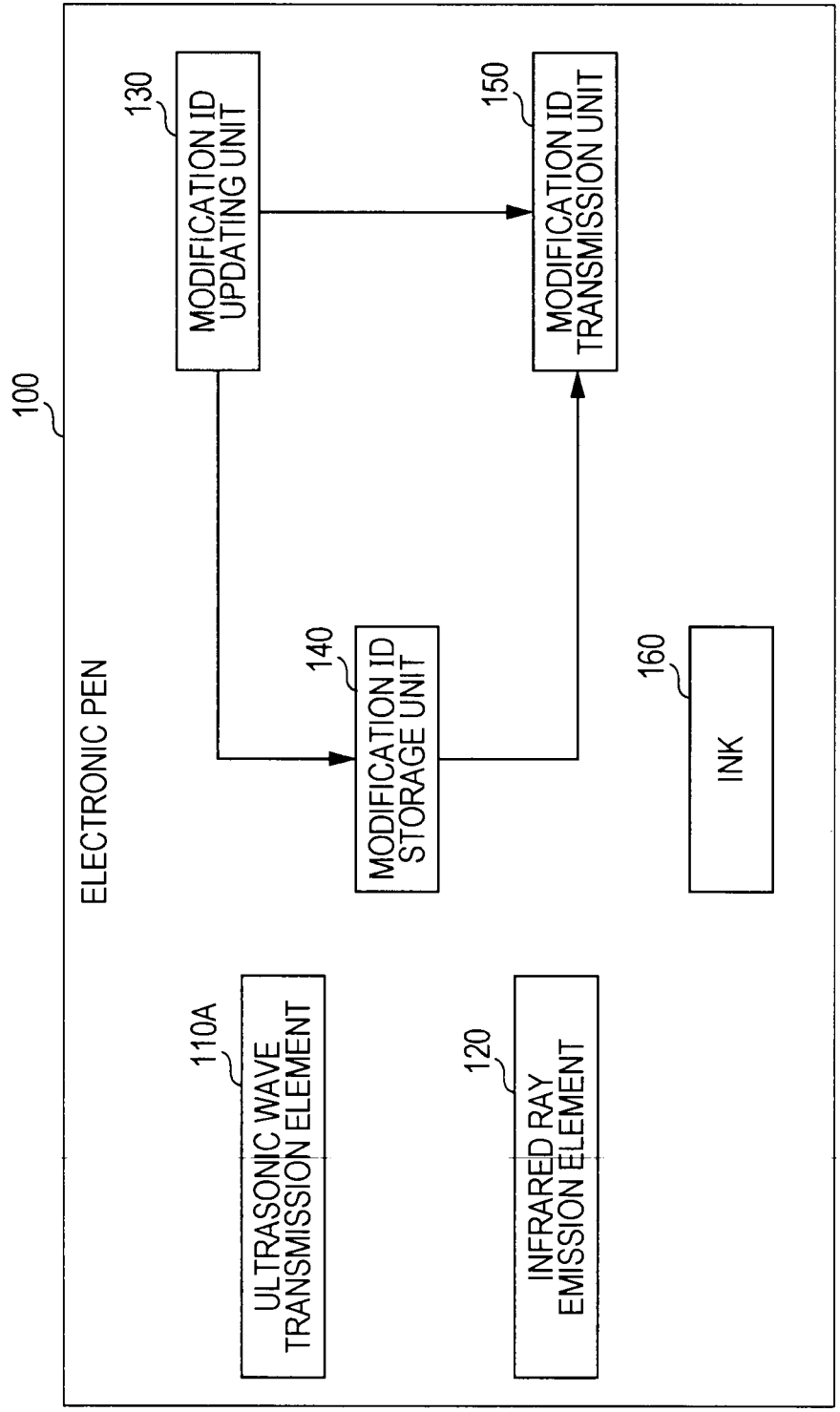
FIG. 8 is a diagram showing the functional configuration of an electronic pen in the case where a modification ID updating unit (a component for changing the color of handwriting data) is provided in an electronic pen and a position detection unit is provided in a receiver, according to the same embodiment.

As shown in FIG. 6, for example, as an example of the component for changing the color of the handwriting data, buttons 130A are included in a receiver 200A. Although, in the example shown in FIG. 6, three buttons 130A are included in the receiver 200A, the number of buttons 130A is not specially limited thereto. Each button 130A may be, for example, separately prepared with respect to each color as shown in FIG. 6, and a modification ID stored in a modification ID storage unit (a flash memory mounted in the receiver 200 or the like) may be updated by a color ID corresponding to a button 130A pressed by the user. Alternatively, whenever the button 130A is pressed by the user, the modification ID stored in the modification ID storage unit may be cyclically updated by a different color ID. The receiver 200A may include a display 235 for displaying an indicator indicating a current modification ID. In addition, although the case where the electronic pen 100 includes the modification ID storage unit is shown in FIG. 8, the receiver 200A may include a modification ID updating unit and a modification ID storage unit.

1-7. Case where Slide for Changing Color is Provided on Receiver

Figure 7:
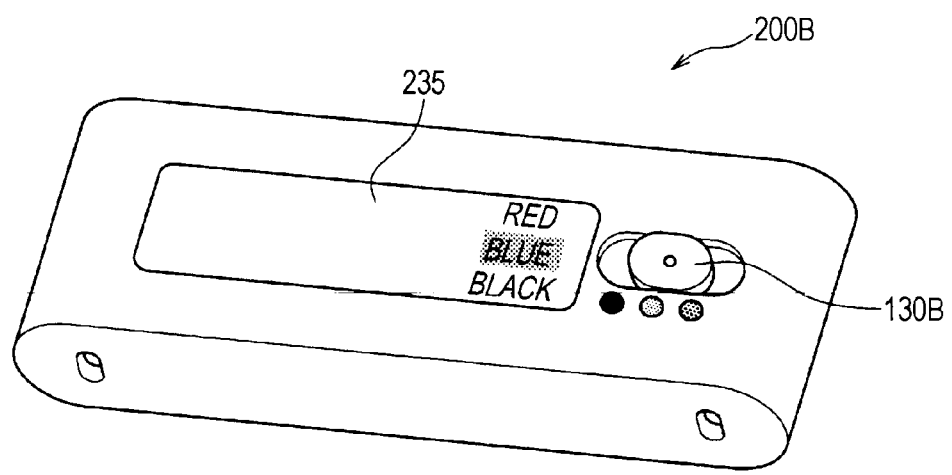
FIG. 7 is a diagram showing the overview of a receiver, in which a slide configuring a modification ID updating unit (a component for changing the color of handwriting data) is provided on a surface thereof, according to the same embodiment.

FIG. 7 is a diagram showing the overview of a receiver, in which a slide configuring a modification ID updating unit (a component for changing the color of handwriting data) is provided on a surface thereof, according to the first embodiment of the present invention. The receiver, in which the slide configuring the modification ID updating unit (the component for changing the color of handwriting data) is provided on the surface thereof, according to the same embodiment, will be described with reference to FIG. 7.

As shown in FIG. 7, for example, as an example of the component for changing the color of the handwriting data, a slide 130B is included in a receiver 200B. In the slide 130B, for example, as shown in FIG. 7, an indicator corresponding to each color is prepared so as to select a color, and a modification ID stored in a modification ID storage unit (a flash memory mounted in the receiver 200 or the like) is updated by a color ID corresponding to an indicator to which the slide 130B is matched by user. The receiver 200A may include a display 235 for displaying an indicator indicating a current modification ID.

1-8. Functional Configuration of Electronic Pen

FIG. 8 is a diagram showing the functional configuration of an electronic pen in the case where a modification ID updating unit (a component for changing the color of handwriting data) is provided in an electronic pen and a position detection unit is provided in a receiver, according to the first embodiment of the present invention. The functional configuration of the electronic pen in the case where the modification ID updating unit (the component for changing the color of handwriting data) is mounted in the electronic pen and the position detection unit is mounted in the receiver according to the same embodiment will be described with reference to FIG. 8.

As shown in FIG. 8, the electronic pen 100 according to the first embodiment of the present invention mainly includes an ultrasonic wave transmission element 110A, an infrared ray emission element 120, a modification ID updating unit 130, a modification ID storage unit 140, a modification ID transmission unit 150 and an ink 160. The ultrasonic wave transmission element 110A corresponds to the speaker 111 of the above example and the infrared ray emission element 120 corresponds to the LED 112 of the above example.

The modification ID storage unit 140 has a function for storing a modification ID for identifying modification of the position of the pen tip of the electronic pen 100. As described above, the modification ID storage unit 140 may be included in the electronic pen 100 or may be included in the receiver 200. The modification ID storage unit 140 includes a storage device or the like and, for example, includes a flash memory or the like. The modification of the position of the electronic pen 100 indicates, for example, a color used to color the position when the position of the electronic pen 100 is displayed on the display or is printed on paper.

The modification ID updating unit 130 has a function for updating a modification ID stored by the modification ID storage unit 140. As described above, the modification ID updating unit 130 may be included in the electronic pen 100 or may be included in the receiver 200. The modification ID updating unit 130 includes, for example, the buttons 130A, the slide 130B, the rotation adjustment unit 130C, or the like, as described above. That is, the modification ID updating unit 130 includes, for example, the buttons 130A provided on the surface of the electronic pen 100, and, when a button 130A is pressed by the user, the modification ID stored by the modification ID storage unit 140 may be updated by an ID corresponding to the pressed button 130A.

In addition, the modification ID updating unit 130 includes, for example, the slide 130B provided on the surface of the electronic pen 100, and, when the slide 130B is moved by the user, the modification ID may be updated by an ID corresponding to a position to which the slide is matched after movement. In addition, the modification ID updating unit 130 includes, for example, the rotation adjustment unit 130C rotated by twisting the electronic pen 100, and, when the rotation adjustment unit 130C is rotated by the user, the modification ID may be updated by an ID corresponding to a position to which the rotation adjustment unit 130C is matched after rotation.

The modification ID transmission unit 150 has a function for transmitting the modification ID stored by the modification ID storage unit 140 to the receiver 200. The modification ID transmission unit 150 includes, for example, the ultrasonic wave transmission element 110A and transmits the modification ID included in the ultrasonic waves. The modification ID transmission unit 150 includes, for example, the infrared ray emission element 120 and transmits the modification ID included in the infrared ray. In the case where the receiver 200 includes a reception element for receiving the modification ID, the modification ID transmission unit 150 transmits only the modification ID. In this case, the modification ID transmission unit 150 may transmit the modification ID separately from the ultrasonic waves transmitted by the ultrasonic wave transmission element 110A or the infrared rays emitted from the infrared ray emission element 120 such that the reception element for receiving the modification ID receives the modification ID. In the case where the modification ID updating unit 130 and the modification ID storage unit 140 are included in the receiver 200, the modification ID transmission unit 150 may not be present in the electronic pen 100.

The ink 160 is filled in the electronic pen 100 and, as described above, the ink filled in the electronic pen 100 is attached to the writing trace when the user performs handwriting using the electronic pen 100 on paper or the like. To this end, the user may check handwriting on the paper. However, in either case, since the handwriting data is input to the electronic pen 100, the ink 160 may not be filled in the electronic pen 100. In addition, as the color of the ink 160, one color such as black may be used or an ink of a color corresponding to a modification ID may be used whenever the modification ID stored by the modification ID storage unit 140 is updated.

In addition, as described above, the electronic pen 100 may include, for example, a pressure sensor on a pen tip. When the pressure sensor detects pressure generated by pressing the pen tip while the user performs handwriting, the transmission device 110 may transmit the infrared rays and the ultrasonic waves and the receiver 200 may detect the position of the electronic pen 100 when the infrared rays and the ultrasonic waves are received.

In addition, the electronic pen 100 may have a function for displaying a color corresponding to a modification ID currently stored by the modification ID storage unit 140 such that the user can confirm the modification ID currently stored by the modification ID storage unit 140. For example, the electronic pen 100 may have an LED for displaying the color corresponding to the modification ID currently stored by the modification ID storage unit 140.

1-9. Functional Configuration of Receiver

Figure 9:
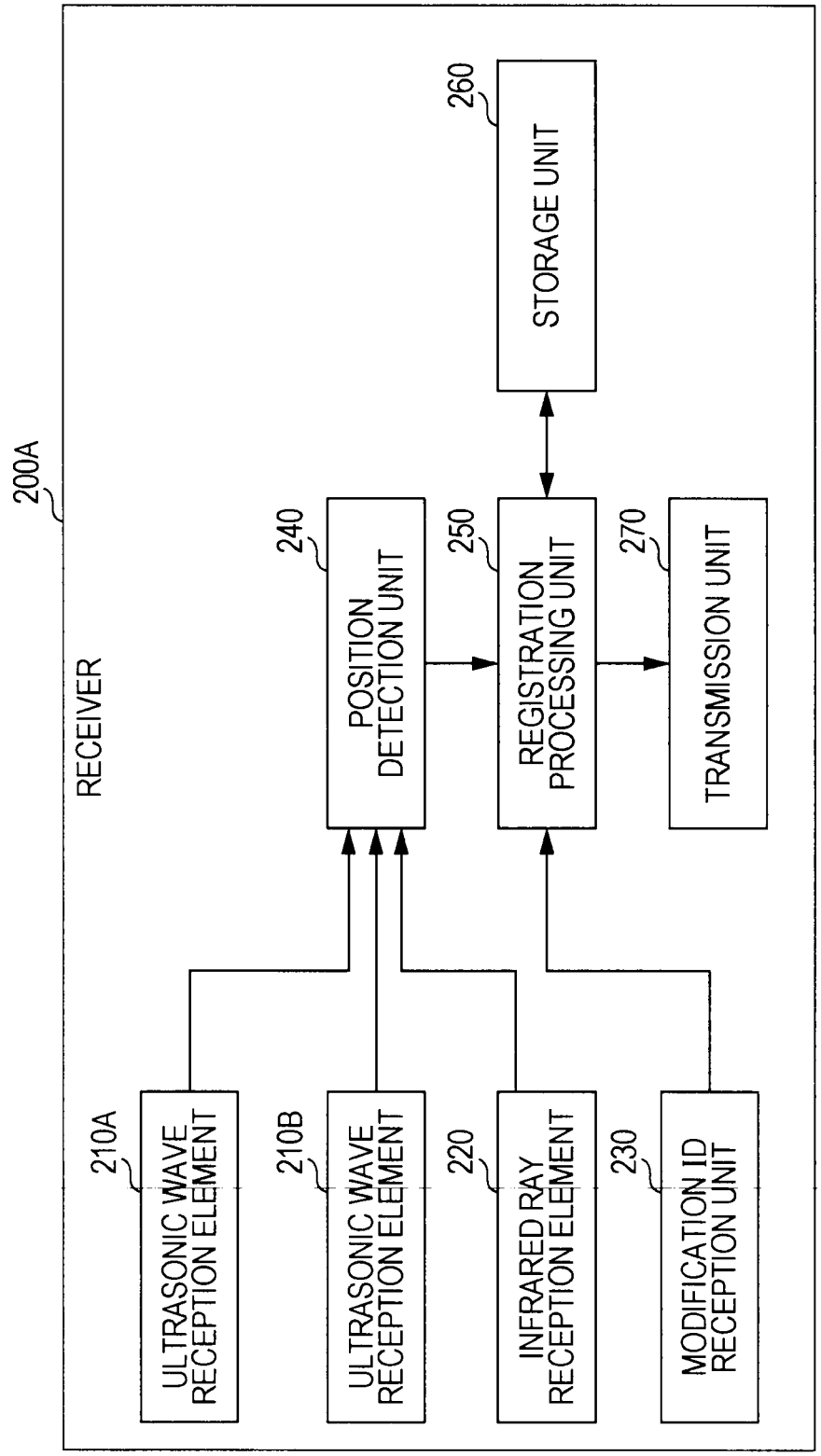
FIG. 9 is a diagram showing the functional configuration of a receiver in the case where a modification ID updating unit (a component for changing the color of handwriting data) is provided in an electronic pen and a position detection unit is provided in the receiver, according to the same embodiment.

FIG. 9 is a diagram showing the functional configuration of a receiver in the case where a modification ID updating unit (a component for changing the color of handwriting data) is provided in an electronic pen and a position detection unit is provided in the receiver, according to the first embodiment of the present invention. The functional configuration of the receiver in the case where the modification ID updating unit (the component for changing the color of handwriting data) is mounted in the electronic pen and the position detection unit is mounted in the receiver according to the same embodiment will be described with reference to FIG. 9.

As shown in FIG. 9, the receiver 200A includes an ultrasonic wave reception element 210A, an ultrasonic wave reception element 210B, an infrared ray reception element 220, a modification ID reception unit 230, a position detection unit 240, a registration processing unit 250, a storage unit 260 and a transmission unit 270. The ultrasonic wave reception element 210A corresponds to the microphone 211A of the above example, the ultrasonic wave reception element 210B corresponds to the microphone 211B of the above example, and the infrared ray reception element 220 corresponds to the photodiode 212 of the above example.

The modification ID reception unit 230 has a function for receiving a modification ID transmitted from the electronic pen 100. The modification ID reception unit 230 includes, for example, a reception element for receiving the modification ID. However, in the case where the modification ID is transmitted from the electronic pen 100 in a state of being included in the ultrasonic waves or the infrared rays, the modification ID reception unit 230 may include the microphone 211A, may include the photodiode 212, or may include the microphone 211B. In the case where the modification ID updating unit 130 and the modification ID storage unit 140 are included in the receiver 200, the modification ID reception unit 230 may not be present in the receiver 200A.

The position detection unit 240 has a function for detecting the position of the pen tip of the electronic pen 100 and acquiring positional information indicating the position of the pen tip of the electronic pen 100. In the method of detecting the position of the pen tip of the electronic pen 100, various methods may be considered as described and the method is not specially limited. However, in the present embodiment, the receiver 200 detects the position of the electronic pen 100 by the infrared/ultrasonic method. In the case where the position of the electronic pen 100 is detected, for example, by the Anoto method (registered trademark) method or the like, the position detection unit 240 may be included in the electronic pen 100.

The registration processing unit 250 has a function for registering the modification ID stored by the modification ID storage unit 140 and the positional information acquired by the position detection unit 240, both of which are associated with each other, as associated information in the storage unit 260. In the case where the modification ID storage unit 140 is included in the electronic pen 100, as the modification ID, a modification ID may be used which is transmitted from the electronic pen 100 by the modification ID transmission unit 150 and is received by the modification ID reception unit 230 of the receiver 200. In the case where the position detection unit 240 is included in the electronic pen 100, as the positional information, positional information may be used which is acquired and transmitted by the electronic pen 100 and is received by the receiver 200.

The storage unit 260 has a function for storing the associated information as described above. The storage unit 260 includes a storage device and, for example, as described above, includes a flash memory or the like. The positional information is recorded in the storage unit 260 by the registration processing unit 250 as handwriting data indicating handwriting of the user.

The transmission unit 270 has a function for transmitting the associated information stored by the storage unit 260 to the information processing device 300. The transmission unit 270 transmits the associated information to the information processing device 300, for example, when the connection between the receiver 200 and the information processing device 300 is detected by the receiver 200A. The receiver 200A may be mounted in the information processing device 300. In this case, the transmission unit 270 may not be present.

1-10. Functional Configuration of Information Processing Device

Figure 10:
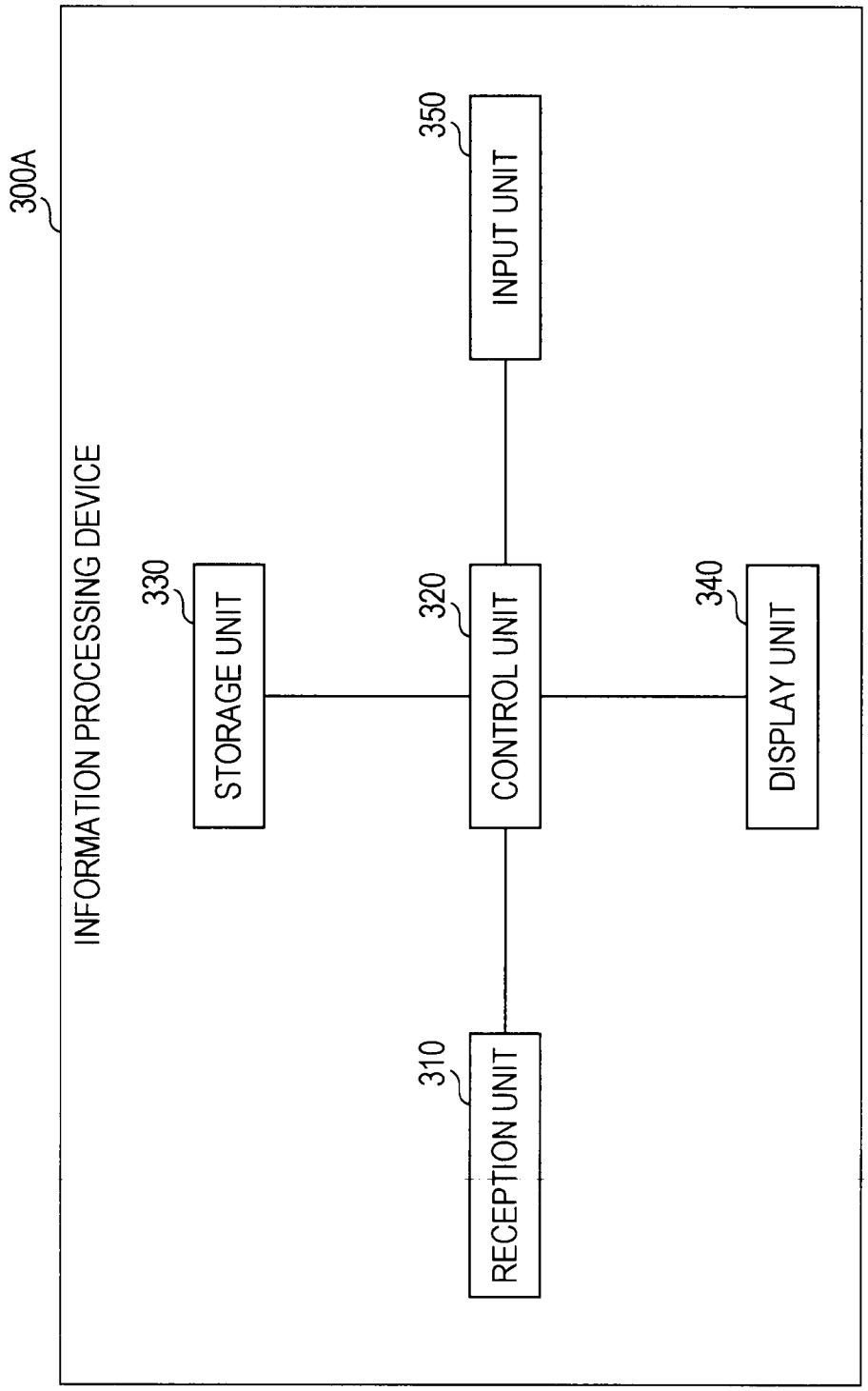
FIG. 10 is a diagram showing the functional configuration of an information processing device according to the same embodiment.

FIG. 10 is a diagram showing the functional configuration of an information processing device according to the first embodiment of the present invention. The functional configuration of the information processing device according to the same embodiment will be described with reference to FIG. 10.

As shown in FIG. 10, an information processing device 300A according to the first embodiment mainly includes a reception unit 310, a control unit 320, a storage unit 330, a display unit 340, and an input unit 350.

The reception unit 310 has a function for receiving the associated information transmitted from the receiver 200. The associated information is information indicating the association between the modification ID and the handwriting data as described above. For example, in the case where the receiver 200 is mounted in the information processing device 300, the reception unit 310 may not be present. The reception unit 310 may include, for example, a communication device.

The control unit 320 has a function for controlling the operation of the information processing device 300A. The control unit 320 has, for example, a function for storing the associated information received by the reception unit 310 in the storage unit 330. In addition, the control unit 320 has, for example, a function for displaying handwriting on the display unit 340 based on the associated information stored by the storage unit 330.

The control unit 320 performs modification identified by the corresponding modification ID with respect to each position indicated by the positional information included in the associated information stored by the storage unit 330 and displays the modified result on the display unit 340 as handwriting. The control unit 320 includes, for example, a Central Processing Unit (CPU), a Random Access Memory (RAM) and the like and realizes the function by developing and executing a program stored by the storage unit 330 in the RAM by the CPU.

The storage unit 330 has a function for storing data, programs or the like used by the control unit 320. The storage unit 330 includes, for example, a storage device such as a Hard Disk Drive (HDD) or a semiconductor memory.

The display unit 340 has a function for displaying a variety of data according to a variety of data output from the control unit 320. The display unit 340 includes, for example, a display device.

The input unit 350 has a function for receiving an input of manipulation information from the user. The input unit 350 has, for example, a function for receiving an input of manipulation information indicating timing or the like of the control unit 320 making the display unit 340 display the associated information stored by the storage unit 330 or the like as handwriting. The input unit 350 includes, for example, an input device such as a mouse or a keyboard.

Figure 11:
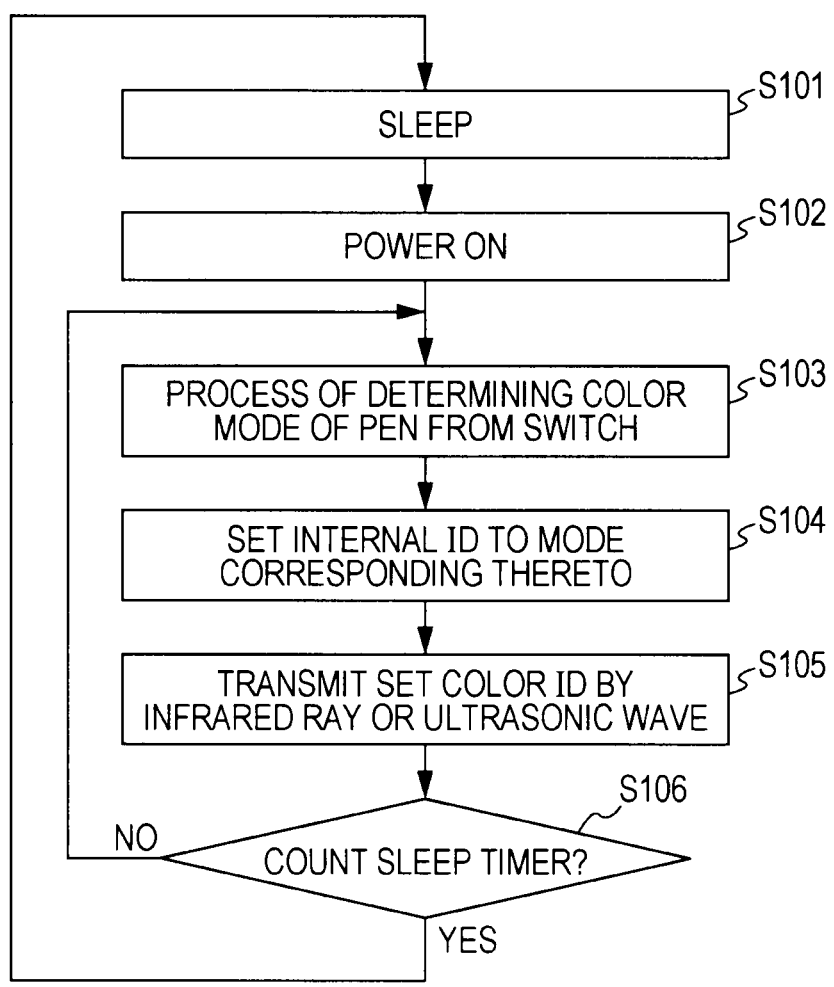
FIG. 11 is a flowchart illustrating the flow of a process executed by an electronic pen in the case where buttons configuring a modification ID updating unit (a component for changing the color of handwriting data) are provided in the electronic pen, according to the same embodiment.

1-11. Process Executed by Electronic Pen in the Case where Buttons are Present on Electronic Pen FIG. 11 is a flowchart illustrating the flow of a process executed by an electronic pen in the case where buttons configuring a modification ID updating unit (a component for changing the color of handwriting data) are provided in the electronic pen, according to the first embodiment of the present invention. The process executed by the electronic pen in the case where the buttons configuring the modification ID updating unit (the component for changing the color of handwriting data) are provided in the electronic pen according to the same embodiment will be described with reference to FIG. 11.

As shown in FIG. 11, first, in a sleep state (step S101), the power of the electronic pen 100A is turned on by manipulation or the like from the user (step S102). The electronic pen 100A performs a process of determining a color mode of the electronic pen 100A received from a switch (button 130A) (step S103) and sets an internal ID to a mode corresponding thereto (step S104). The color mode is an example of the modification ID and the internal ID corresponds to the modification ID stored by the modification ID storage unit 140 of the above example.

Next, the electronic pen 100A transmits the set color ID to the receiver 200A by the infrared rays or the ultrasonic waves (step S105). The color ID may be transmitted to the receiver 200A by means other than the infrared rays or the ultrasonic waves as described above. The color mode is an example of the modification ID. The electronic pen 100A counts a timer for going into the sleep state (step S106), returns to step S101 if it is determined that time-out has been generated ("Yes" in Step S106) and returns to step S103 if it is determined that time-out has not been generated ("No" in step S106).

Figure 12:
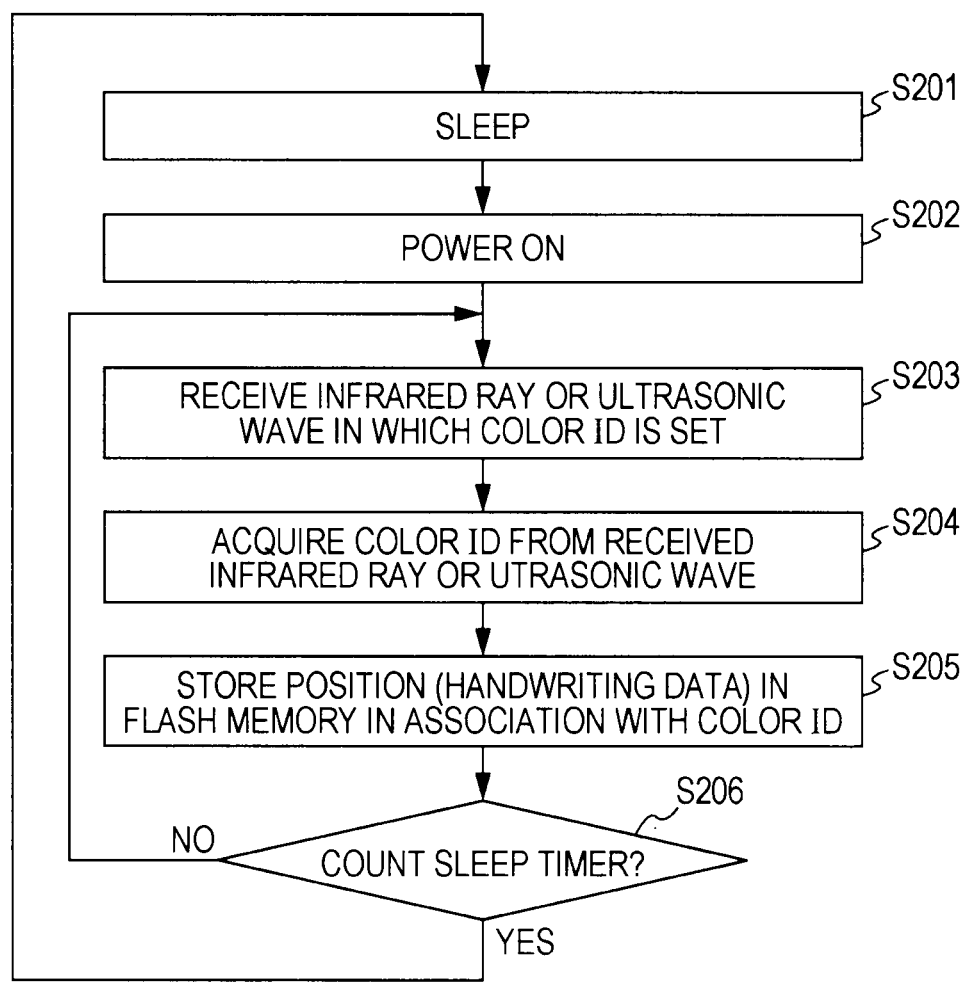
FIG. 12 is a flowchart illustrating the flow of a process executed by a receiver in the case where buttons configuring a modification ID updating unit (a component for changing the color of handwriting data) are provided in an electronic pen, according to the same embodiment.

1-12. Process Executed by Receiver in the Case where Buttons are Present on Electronic Pen FIG. 12 is a flowchart illustrating the flow of a process executed by a receiver in the case where buttons configuring a modification ID updating unit (a component for changing the color of handwriting data) are provided in an electronic pen, according to the first embodiment of the present invention. The process executed by the receiver in the case where the buttons configuring the modification ID updating unit (the component for changing the color of handwriting data) are provided in the electronic pen according to the same embodiment will be described with reference to FIG. 12.

As shown in FIG. 12, first, in a sleep state (step S201), the power of the receiver 200A is turned on by manipulation or the like from the user (step S202). The receiver 200A receives the infrared rays or the ultrasonic waves in which a color ID is set (step S203) and acquires the color ID from the received infrared rays or ultrasonic waves (step S204). The color ID is an example of the modification ID.

Next, the receiver 200A stores a position (handwriting data) in the flash memory (an example of the storage unit 260) in association with the color ID (step S205). The receiver 200A counts a timer for going into the sleep state (step S206), returns to step S201 if it is determined that time-out has been generated ("Yes" in Step S206) and returns to step S203 if it is determined that time-out has not been generated ("No" in step S206).

2. Second Embodiment

Case of Using Dedicated Paper in which Partitions for Specifying Colors are Arranged Subsequently, a second embodiment of the present invention will be described. In the second embodiment of the present invention, dedicated paper in which partitions for specifying colors are arranged is used so as to change the color. The information processing system according to the second embodiment of the present invention is mainly different from the information processing system according to the first embodiment of the present invention in the configuration of the receiver.

2-1. Functional Configuration of Receiver

Figure 13:
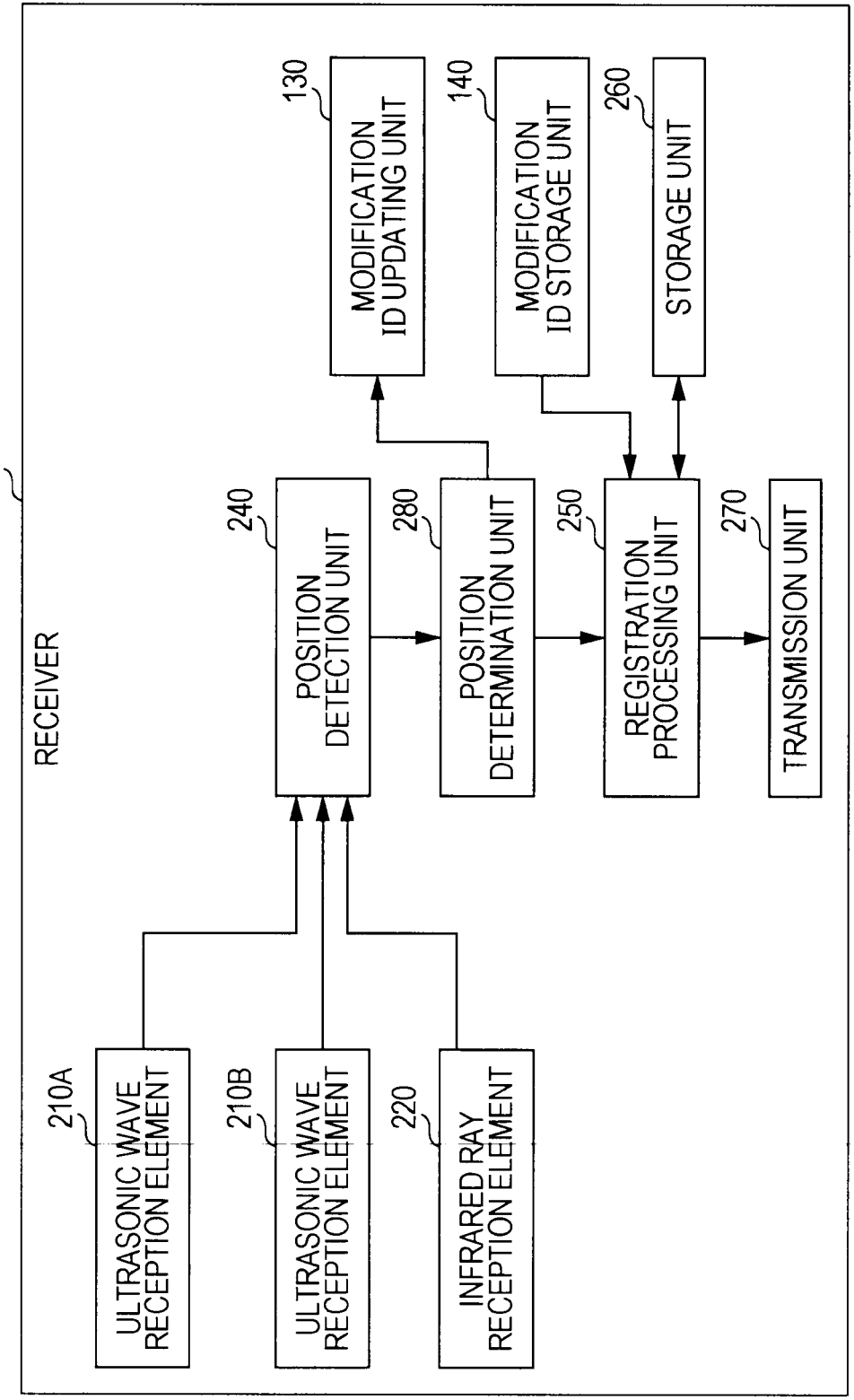
FIG. 13 is a diagram showing the functional configuration of a receiver according to a second embodiment of the present invention.

FIG. 13 is a diagram showing the functional configuration of a receiver according to a second embodiment of the present invention. The functional configuration of the receiver according to the same embodiment will be described with reference to FIG. 13.

As shown in FIG. 13, the receiver 200B according to the second embodiment of the present invention may not include the modification ID reception unit 230 which is included in the receiver 200A according to the first embodiment of the present invention. In addition, the receiver 200B according to the second embodiment of the present invention includes a modification ID updating unit 130, a modification ID storage unit 140 and a position determination unit 280. Accordingly, in the second embodiment of the present invention, the electronic pen 100 may not include the modification ID updating unit 130, the modification ID storage unit 140 and the modification ID transmission unit 150.

The position determination unit 280 has a function for analyzing the positional information acquired by the position detection unit 240 and updating the modification ID stored by the modification ID storage unit 140 by an ID corresponding to a predetermined partition by the modification ID updating unit 130 if it is determined that the positional information indicates a position in the predetermined partition. The predetermined partition will be described later using FIG. 14. In addition, for example, in the case where association between the partition positional information indicating the position in the predetermined partition and the ID is stored by the storage unit 260, the position determination unit 280 may acquire the ID corresponding to the partition positional information matched to the positional information acquired by the position detection unit 240 from the storage unit 260 and use the ID in the updating of the modification ID updating unit 130.

2-2. Example of Using Receiver in Case of Using Dedicated Paper

Figure 14:
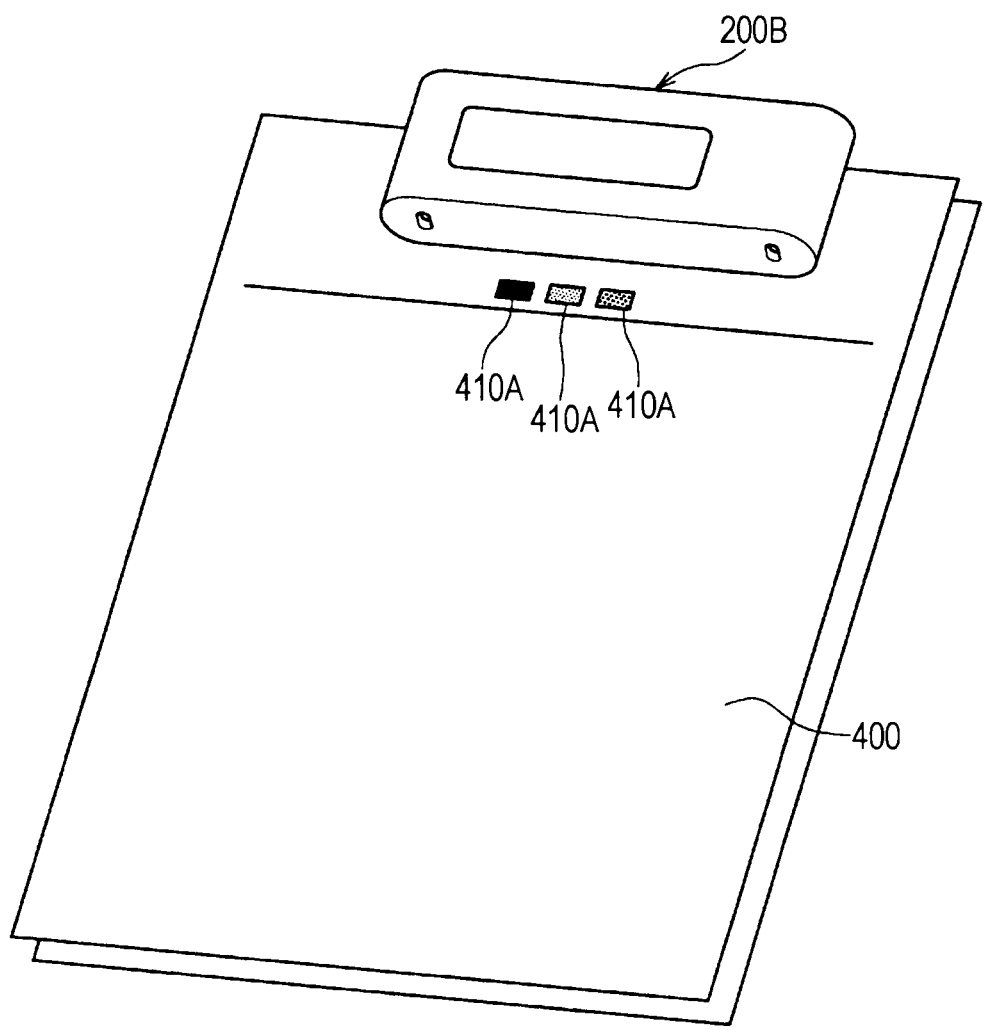
FIG. 14 is a diagram showing an example of using a receiver according to the same embodiment.

FIG. 14 is a diagram showing an example of using a receiver according to the second embodiment of the present invention. The example of using the receiver according to the same embodiment will be described with reference to FIG. 14.

As shown in FIG. 14, partitions 410A are displayed on paper 400 used when the user performs handwriting using the electronic pen 100. Although three partitions 410A are displayed, the number of partitions 410A is not specially limited as long as it is plural. When the user touches the inside of any one of the partitions 410A using the electronic pen 100, the receiver 200B analyzes the positional information indicating the touched position and determines that positional information indicates the inside of any one of the partitions 410A.

In order to realize this, for example, in the case where an indicator indicating the mount position of the receiver 200B is described on paper 400 in advance and the receiver 200B stores the position of the partition 410A in advance, the user may mount the receiver 200B so as to match the indicator. Alternatively, if a correction indicator is described on paper 400, the receiver 200B stores displacement between the position of the correction indicator and the position of the partition 410A in advance, and the user mounts the receiver 200B at an appropriate portion of the paper 400 and touches the correction indicator using the electronic pen 100, the receiver 200B may correct the position of the partition 410A based on the position touched by the user and the displacement.

2-3. Process Executed by Receiver

Figure 15:
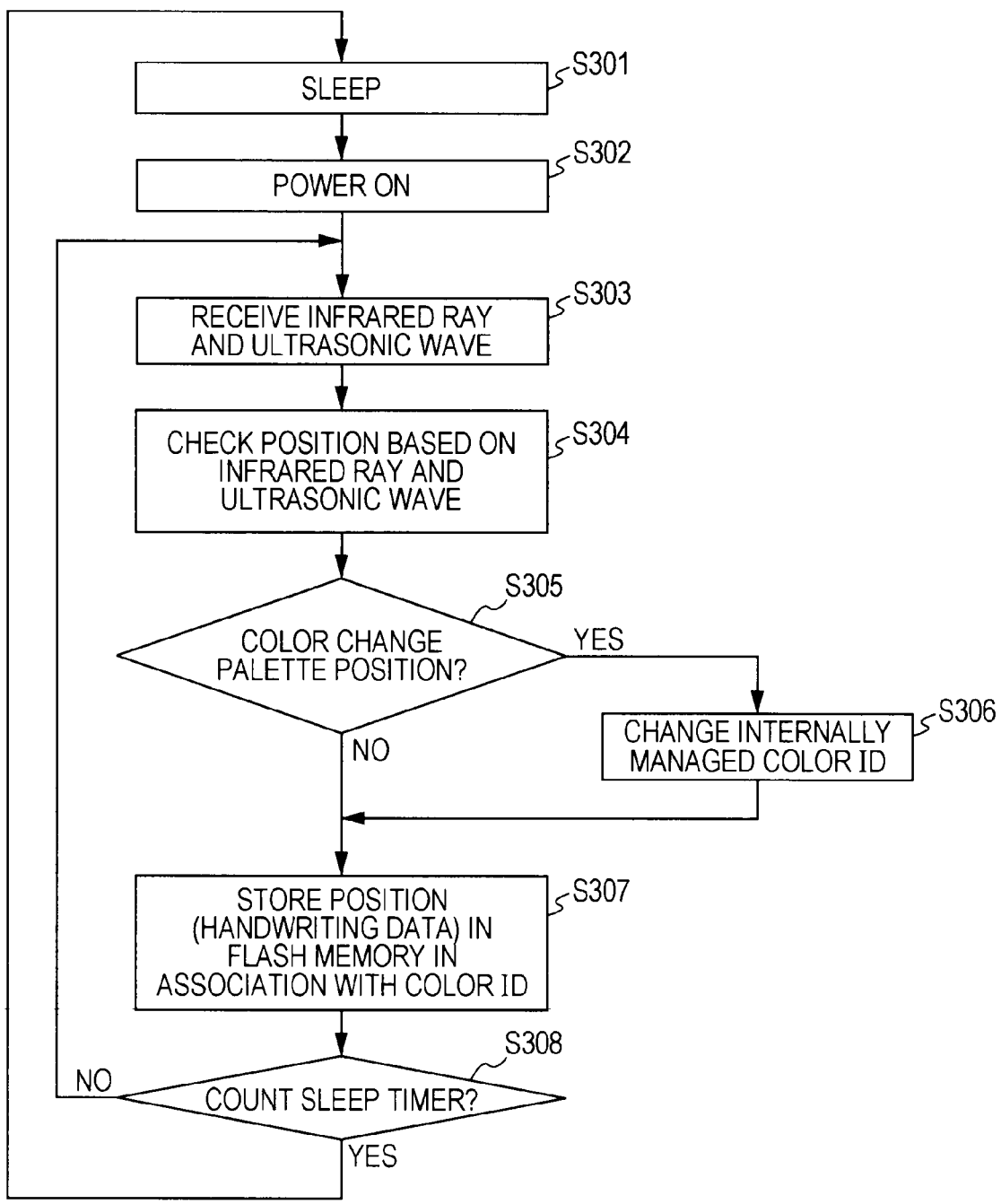
FIG. 15 is a flowchart illustrating the flow of a process executed by a receiver according to the same embodiment.

FIG. 15 is a flowchart illustrating the flow of a process executed by a receiver according to the second embodiment of the present invention. The process executed by the receiver according to the same embodiment will be described with reference to FIG. 15.

As shown in FIG. 15, first, in a sleep state (step S301), the power of the receiver 200B is turned on by manipulation or the like from the user (step S302). The receiver 200A receives the infrared rays and the ultrasonic waves (step S303) and checks the position based on the received infrared rays and ultrasonic waves (step S304).

Next, the receiver 200B determines whether or not the confirmed position is a color change palette position (step S305). The color change palette position corresponds to the position in the partition 410A in the above example. The receiver 200B progresses to step S307 if it is determined that the confirmed position is not the color change palette position ("No" in Step S305). The receiver 200B changes an internally managed color ID (step S306) and progresses to step S307, if it is determined that the confirmed position is the color change palette position ("Yes" in Step S305). The internally managed color ID is an example of the modification ID stored by the modification ID storage unit 140.

The receiver 200B stores the confirmed position (handwriting data) in the flash memory (an example of the storage unit 260) in association with the color ID (step S307). The receiver 200B counts a timer for going into the sleep state (step S308), returns to step S301 if it is determined that time-out has been generated ("Yes" in Step S308) and returns to step S303 if it is determined that time-out has not been generated ("No" in step S308).

3. Third Embodiment

Case where Information Processing Device Changes Color of Handwriting Data

Subsequently, a third embodiment of the present invention will be described. In the third embodiment of the present invention, the information processing device changes the color of handwriting data. The information processing system according to the third embodiment of the present invention is mainly different from the information processing system according to the first embodiment of the present invention in the configuration of the information processing device.

3-1. Functional Configuration of Information Processing Device

Figure 16:
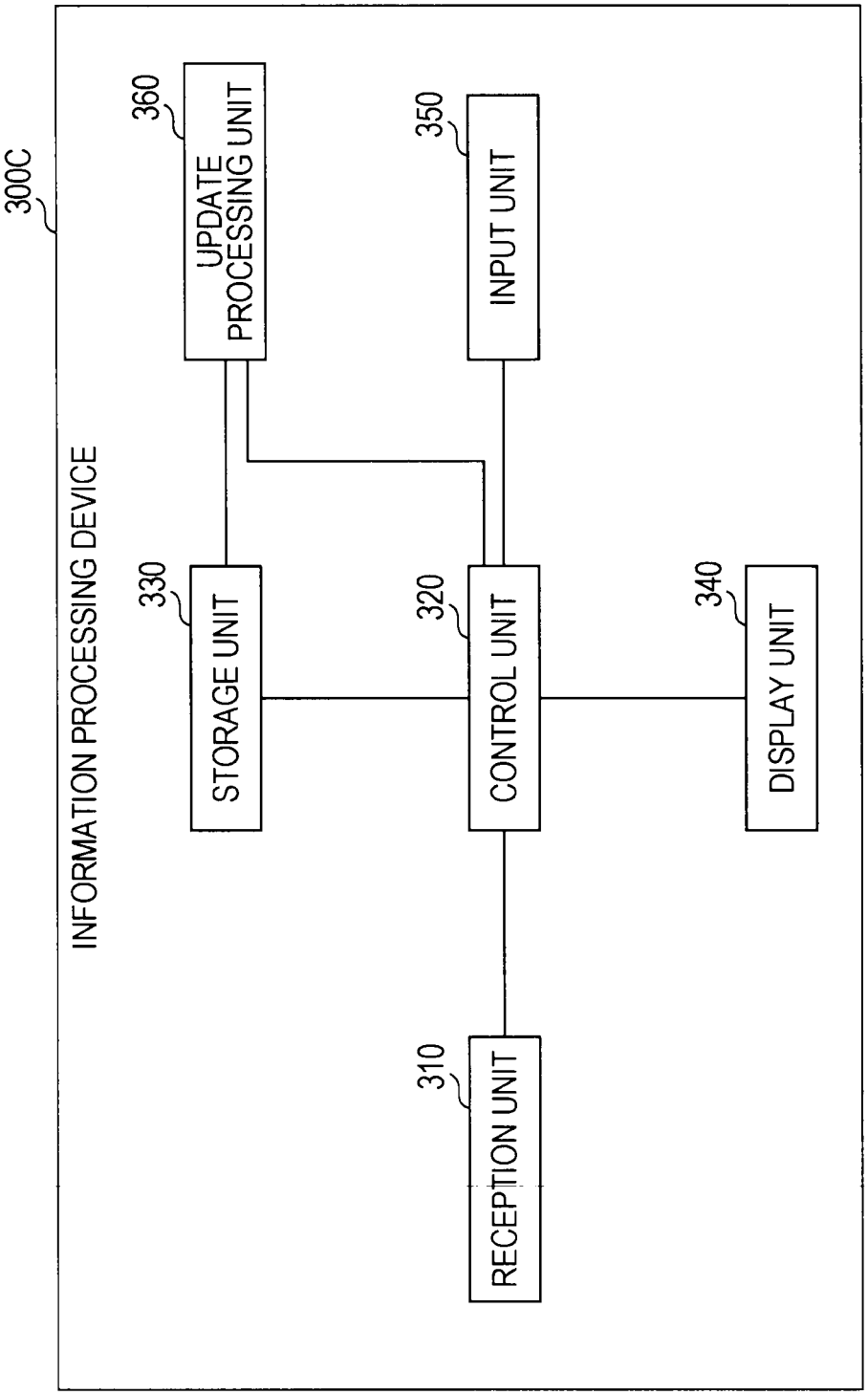
FIG. 16 is a diagram showing the functional configuration of an information processing system according to a third embodiment of the present invention.

FIG. 16 is a diagram showing the functional configuration of an information processing system according to a third embodiment of the present invention. The functional configuration of the information processing device according to the same embodiment will be described with reference to FIG. 16.

As shown in FIG. 16, the information processing device 300C according to the third embodiment of the present invention is different from the information processing device 300A according to the first embodiment of the present invention in that an update processing unit 360 is included. In addition, the modification ID updating unit 130, the modification ID storage unit 140, the modification ID transmission unit 150, the modification ID reception unit 230 and the like mounted in the electronic pen 100A or the receiver 200A according to the first embodiment of the present invention may not present in the third embodiment of the present invention.

The update processing unit 360 has a function for specifying a modification ID for identifying modification of a position indicated by positional information based on the positional information stored by the storage unit 330 and specifying a modification ID change area which is an area to which the modification ID is added. In addition, the information processing device 300C has a function for adding the specified modification ID to the positional information of the modification ID change area. The details of the function of the update processing unit 360 will be described with reference to FIG. 17.

Figure 17:
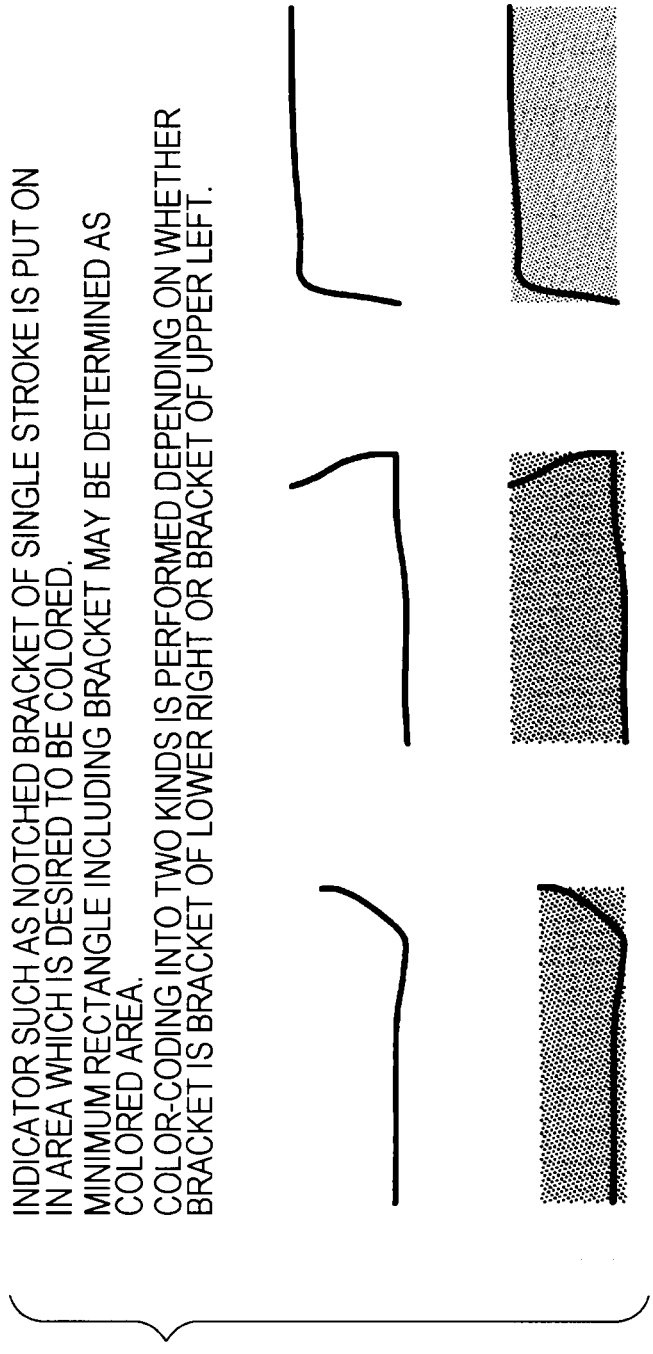
FIG. 17 is a diagram illustrating a method of changing the color of handwriting data by an information processing device according to the same embodiment.

3-2. Method of Changing Color of Handwriting Data by Information Processing Device FIG. 17 is a diagram illustrating a method of changing the color of handwriting data by an information processing device according to the third embodiment of the present invention. The method of changing the color of handwriting data by the information processing device according to the same embodiment will be described with reference to FIG. 17.

As shown in FIG. 17, the update processing unit 360 determines whether or not a predetermined mark is present in the positional information based on the positional information stored by the storage unit 330. The update processing unit 360 specifies an ID for identifying a color attached to a position defined by the predetermined mark as the modification ID, if it is determined that the predetermined mark is present. As the predetermined mark, as described below, various shapes (a notched bracket, an ellipse, a rectangle and the like) may be considered. The update processing unit 360 determines, for example, whether or not the notched bracket is present based on the positional information stored by the storage unit 330. The update processing unit 360 may specify the modification ID from the shape of the notched bracket if it is determined that the notched bracket is present. For example, the storage unit 330 stores information with an association between the shape of the notched bracket and the modification ID and the update processing unit 360 may acquire the modification ID from the information based on the shape of the notched bracket. The shape of the notched bracket includes a notched bracket (⏌) enclosing the lower right and a notched bracket (⌈) enclosing the upper left. The storage unit 330 may store, for example, information with an association between the notched bracket (⏌) enclosing the lower right and information indicating the color red and information with an association between the notched bracket (⌈) enclosing the upper left and information indicating the color blue.

As shown in FIG. 17, the update processing unit 360 may specify, for example, a minimum rectangular area including the above notched bracket as a modification ID change area which is an area to which the modification ID is added. The modification ID change area corresponds to the position defined by the predetermined mark. In addition, the update processing unit 360 may specify a maximum rectangular area included in the notched bracket as a modification ID change area. In addition, although the update processing unit 360 specifies the modification ID and the modification ID change area using the notched bracket as the predetermined mark, the modification ID and the modification ID change area may be specified using a predetermined mark other than the notched bracket. As marks other than the notched bracket, for example, an ellipse, a rectangle or the like can be considered.

Figure 18:
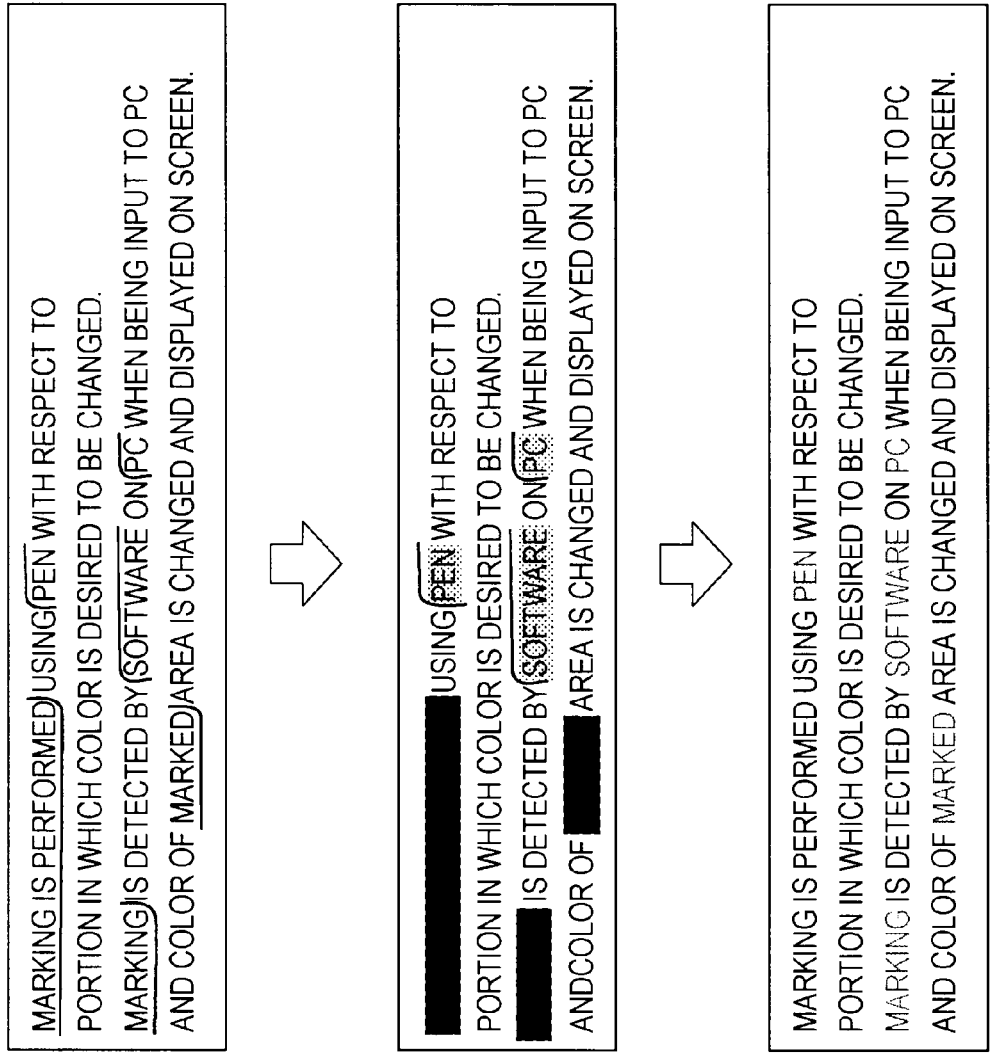
FIG. 18 is a diagram illustrating a step of changing the color of handwriting data by an information processing device according to the same embodiment.

3-3. Step of Changing Color of Handwriting Data by Information Processing Device FIG. 18 is a diagram illustrating a step of changing the color of handwriting data by an information processing device according to the third embodiment of the present invention. The step of changing the color of handwriting data by the information processing device according to the same embodiment will be described with reference to FIG. 18.

As shown in FIG. 18, in the case where a portion is generated in which there is a desire for a color to be changed while the user performs handwriting using the electronic pen 100, for example, a notched bracket is output on the portion. For example, the notched bracket (⌋) enclosing the lower right is output on a portion where there is a desire for it to be changed to red and the notched bracket (⌈) enclosing the upper left is described on a portion where there is a desire for it to be changed to blue. Then, the position of the notched bracket (⌋) enclosing the lower right or the notched bracket (⌈) enclosing the upper left is recognized by the function of the above-described information processing device 300C, and a minimum rectangle including each notched bracket is specified as an area to which the modification ID indicating red will be added or an area to which the modification ID indicating blue will be added. The handwriting belonging to each area is modified to red or blue and displayed by the information processing device 300C.

3-4. Process Executed by Information Processing Device

Figure 19:
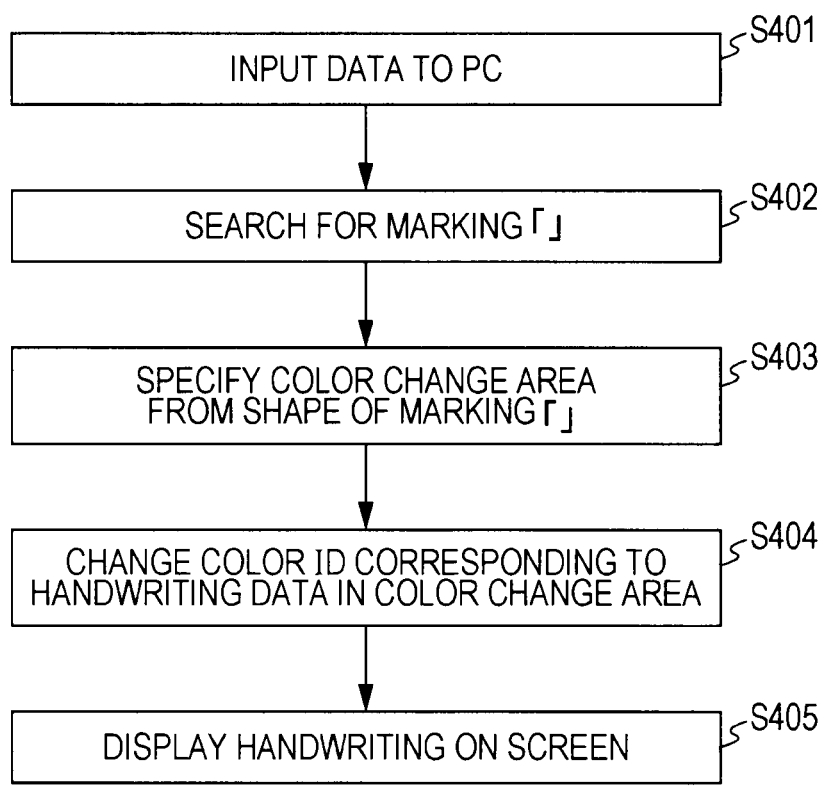
FIG. 19 is a flowchart illustrating the flow of a process of changing the color of handwriting data by an information processing device according to the same embodiment.

FIG. 19 is a flowchart illustrating the flow of a process of changing the color of handwriting data by an information processing device according to the third embodiment of the present invention. The process of changing the color of handwriting data by the information processing device according to the same embodiment will be described with reference to FIG. 19.

As shown in FIG. 19, first, data is input to the information processing device 300C (step S401). The information processing device 300C searches for the notched bracket marking from the input data (step S402), specifies a color change area from the shape of the notched bracket marking (step S403), and changes a color ID corresponding to the handwriting data present in the specified color change area (step S404). Next, the information processing device 300C displays handwriting on a screen based on the handwriting data and the color ID (step S405).

4. Fourth Embodiment

Case where Electronic Pen or Reception Device Erases Handwriting Data

Subsequently, a fourth embodiment of the present invention will be described. In the fourth embodiment of the present invention, an electronic pen or a reception device configuring the information processing system erases handwriting data.

Figure 20:
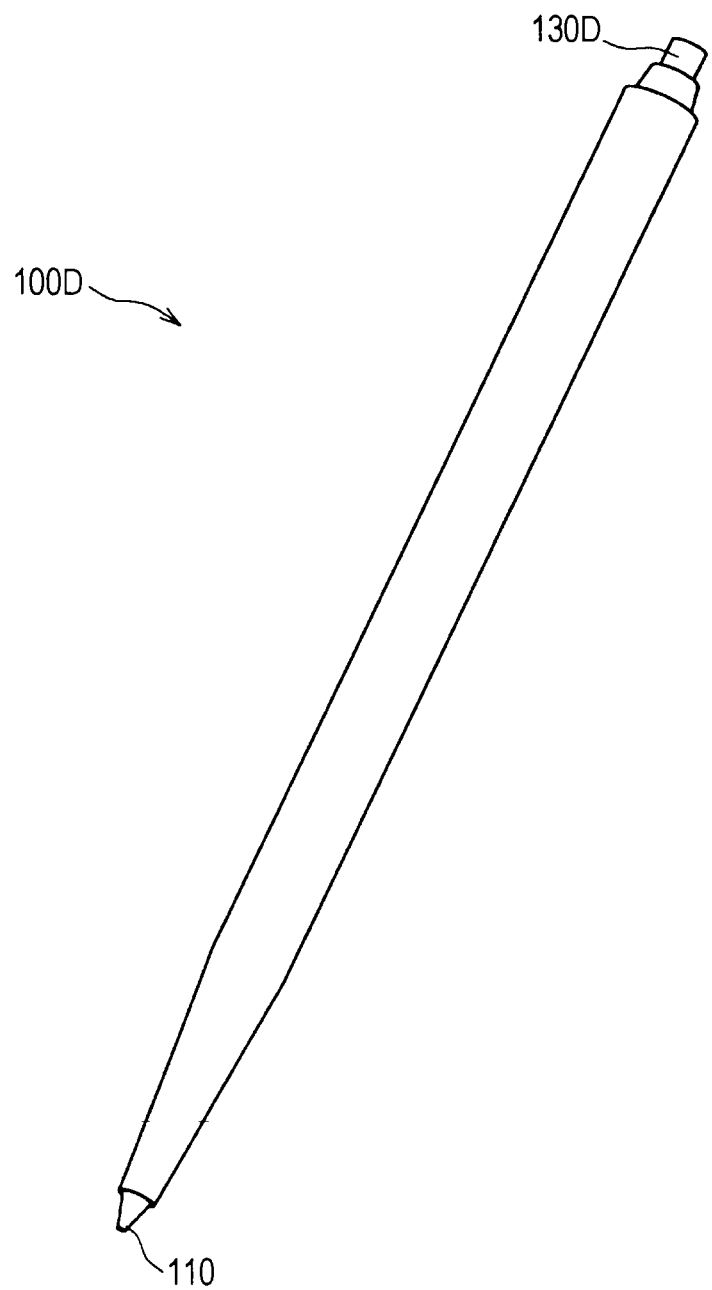
FIG. 20 is a diagram showing the overview of an electronic pen, in which an eraser configuring a modification ID updating unit (a component for erasing handwriting data) is provided on an end opposite to a pen tip, according to a fourth embodiment of the present invention.

4-1. Case where Eraser for Erasing Handwriting Data is Provided on Electronic Pen FIG. 20 is a diagram showing the overview of an electronic pen, in which an eraser configuring a modification ID updating unit (a component for erasing handwriting data) is provided on an end opposite to a pen tip, according to a fourth embodiment of the present invention. The electronic pen, in which the eraser configuring the modification ID updating unit (the component for erasing handwriting data) is provided on the end opposite to the pen tip, according to the same embodiment will be described with reference to FIG. 20.

As shown in FIG. 20, as an example of the component for erasing handwriting data, an eraser 130D is included in an electronic pen 100D. Although the eraser 130D is typically provided on an end opposite to the pen tip of the electronic pen 100D, the eraser may be provided anywhere. The eraser 130D is an example of the component configuring the modification ID updating unit 130. In this case, the modification ID updating unit 130 updates the modification ID stored by the modification ID storage unit 140 by an ID corresponding to the end opposite to the pen tip of the electronic pen 100D, for example, when a pressure sensor is included on the end opposite to the pen tip of the electronic pen 100D and pressure is detected by the pressure sensor.

The position detection unit 240 detects the position of the end opposite to the pen tip of the electronic pen 100D and acquires positional information indicating the position of the end opposite to the pen tip of the electronic pen 100D as positional information. For example, when the pressure sensor provided on the end opposite to the pen tip of the electronic pen 100D detects pressure, the transmission of the ultrasonic waves and the infrared rays from the transmission device 110 provided on the pen tip is stopped and, instead, the ultrasonic waves and the infrared rays are transmitted from a transmission device (not shown) provided on the end opposite to the pen tip. The ID corresponding to the end opposite to the pen tip of the electronic pen 100D is, for example, transmitted in a state of being included in the ultrasonic waves or the infrared rays transmitted from the transmission device (not shown) provided on the end opposite to the pen tip.

For example, in the case where the pen tip of the electronic pen 100D includes a pencil lead, the eraser 130D may have a function for erasing handwriting using a pencil written down by the electronic pen 100D. In addition, in the case where the pen tip of the electronic pen 100D includes an ink and handwriting is performed by the ink, the eraser 130D may have the same function as a correction pen for erasing handwriting using the ink written down by the electronic pen 100D.

4-2. Case where Eraser for Erasing Handwriting Data is Provided on Stick

Figure 21:
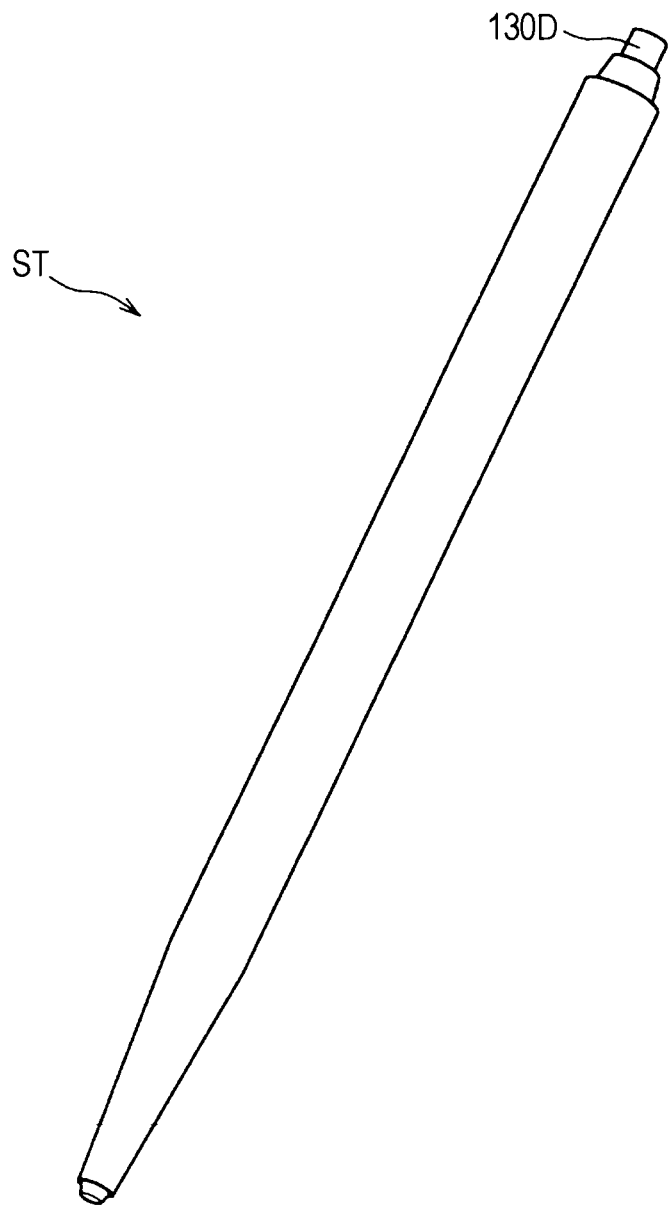
FIG. 21 is a diagram showing the overview of a stick, in which an eraser configuring a modification ID updating unit (a component for erasing handwriting data) is provided, according to the same embodiment.

FIG. 21 is a diagram showing the overview of a stick, in which an eraser configuring a modification ID updating unit (a component for erasing handwriting data) is provided, according to the fourth embodiment of the present invention. The stick, in which the eraser configuring the modification ID updating unit (the component for erasing handwriting data) is provided, according to the same embodiment will be described with reference to FIG. 21.

As shown in FIG. 21, the user may use a stick ST on which an eraser 130D is provided. The stick ST has the same function as the electronic pen 100D shown in FIG. 20.

Figure 22:
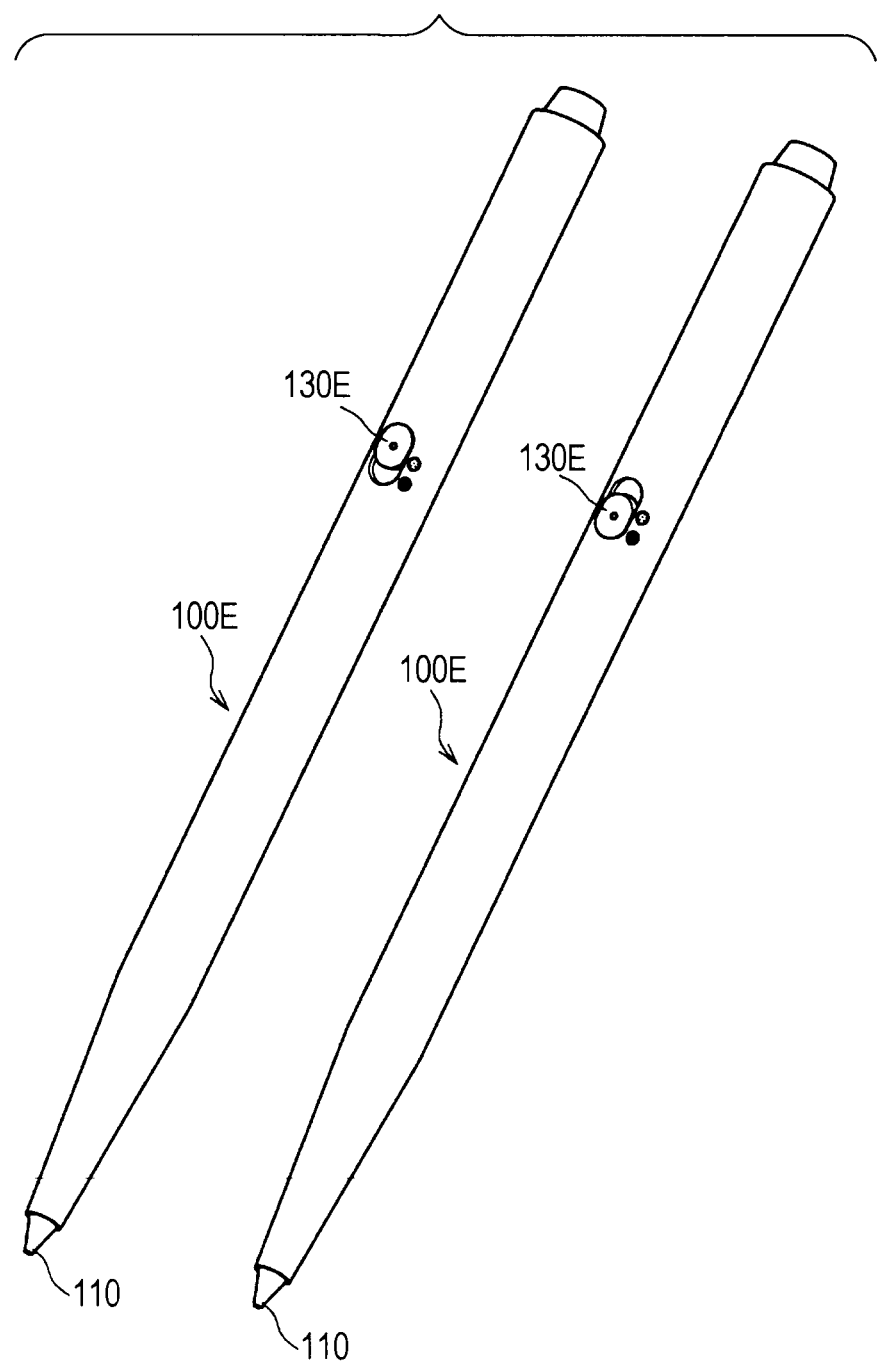
FIG. 22 is a diagram showing the overview of an electronic pen, in which a slide configuring a modification ID updating unit (a component for erasing handwriting data) is provided on a surface thereof, according to the same embodiment.

4-3. Case where Slide for Erasing Handwriting Data is Provided on Electronic Pen FIG. 22 is a diagram showing the overview of an electronic pen, in which a slide configuring a modification ID updating unit (a component for erasing handwriting data) is provided on a surface thereof, according to the fourth embodiment of the present invention. The electronic pen, in which the slide configuring the modification ID updating unit (a component for erasing handwriting data) is provided on the surface thereof, according to the same embodiment, will be described with reference to FIG. 22.

As shown in FIG. 22, for example, an example of the component for erasing handwriting data, a slide 130E is included in an electronic pen 100E. In the slide 130E, for example, as shown in FIG. 22, an indicator corresponding to each color is prepared so each color can be selected, and a modification ID stored in a modification ID storage unit (a flash memory mounted in the electronic pen 100 or the like) is updated by a color ID corresponding to an indicator, to which the slide 130E is matched by user.

4-4. Case where Buttons for Erasing Handwriting Data is Provided on Receiver

Figure 23:
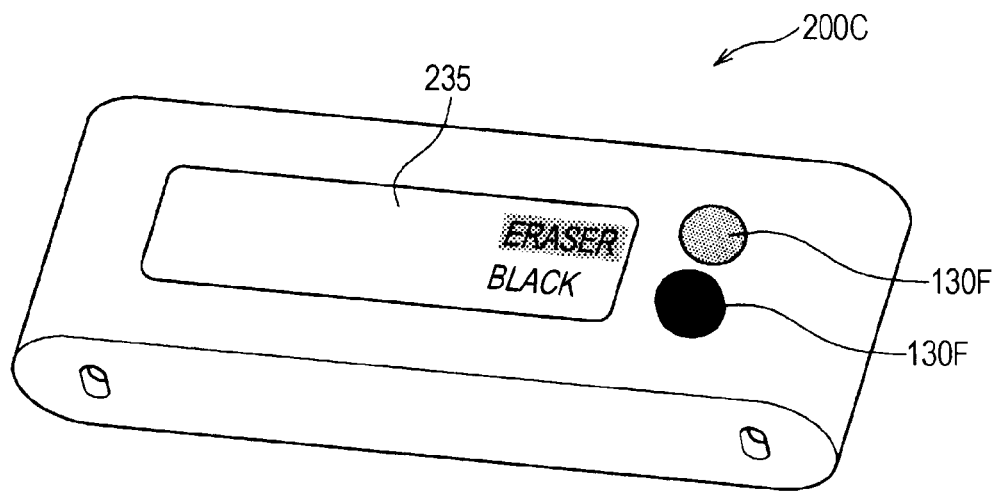
FIG. 23 is a diagram showing the overview of a receiver, in which buttons configuring a modification ID updating unit (a component for erasing handwriting data) are provided on a surface thereof, according to the same embodiment.

FIG. 23 is a diagram showing the overview of a receiver, in which buttons configuring a modification ID updating unit (a component for erasing handwriting data) are provided on a surface thereof, according to the fourth embodiment of the present invention. The receiver, in which buttons configuring the modification ID updating unit (the component for erasing handwriting data) are provided on a surface thereof, according to the same embodiment, will be described with reference to FIG. 23.

As shown in FIG. 23, as an example of the component for erasing the handwriting data, buttons 130F are included in a receiver 200C. Although, in the example shown in FIG. 23, two buttons 130F are included in the receiver 200C, the number of buttons 130F is not specially limited thereto. Each button 130F may be, for example, separately prepared with respect to each color as shown in FIG. 23, and a modification ID stored in a modification ID storage unit (a flash memory mounted in the receiver 200 or the like) may be updated by a color ID corresponding to a button 130F pressed by the user. Alternatively, whenever the button 130F is pressed by the user, the modification ID stored in the modification ID storage unit may be cyclically updated by a different color ID. The receiver 200C may include a display 235 for displaying an indicator indicating a current modification ID. In addition, although the modification ID storage unit is included in the electronic pen 100 in FIG. 8, the receiver 200C may include the modification ID updating unit and the modification ID storage unit.

4-5. Case where Slide for Erasing Handwriting Data is Provided on Receiver

Figure 24:
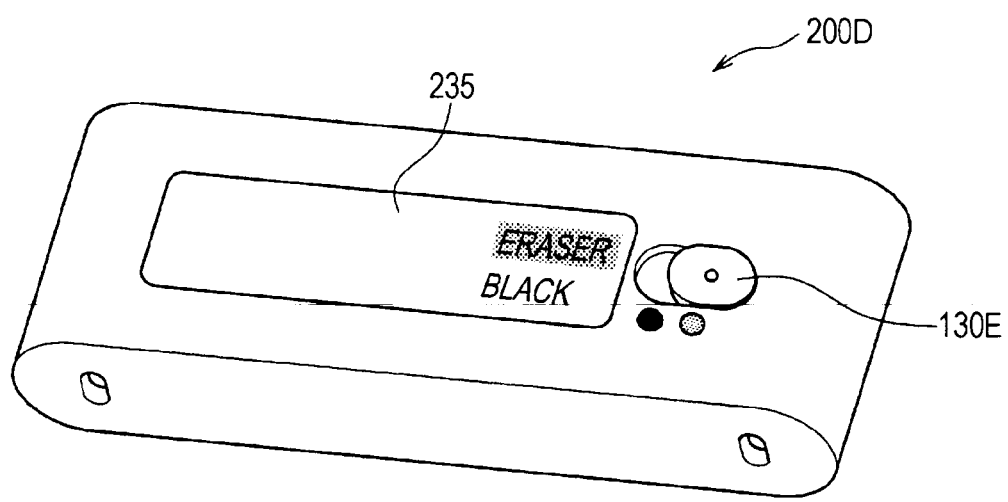
FIG. 24 is a diagram showing the overview of a receiver, in which a slide configuring a modification ID updating unit (a component for erasing handwriting data) is provided on a surface thereof, according to the same embodiment.

FIG. 24 is a diagram showing the overview of a receiver, in which a slide configuring a modification ID updating unit (a component for erasing handwriting data) is provided on a surface thereof, according to the fourth embodiment of the present invention. The receiver, in which the slide configuring the modification ID updating unit (the component for erasing handwriting data) is provided on the surface thereof, according to the same embodiment, will be described with reference to FIG. 24.

As shown in FIG. 24, for example, as an example of the component for erasing the color of the handwriting data, a slide 130E is included in a receiver 200D. In the slide 130E, for example, as shown in FIG. 24, an indicator corresponding to each color is prepared so as to select a color, and a modification ID stored in a modification ID storage unit (a flash memory mounted in the receiver 200 or the like) is updated by a color ID corresponding to an indicator, to which the slide 130E is matched by user. The receiver 200D may include a display 235 for displaying an indicator indicating a current modification ID.

Figure 25:
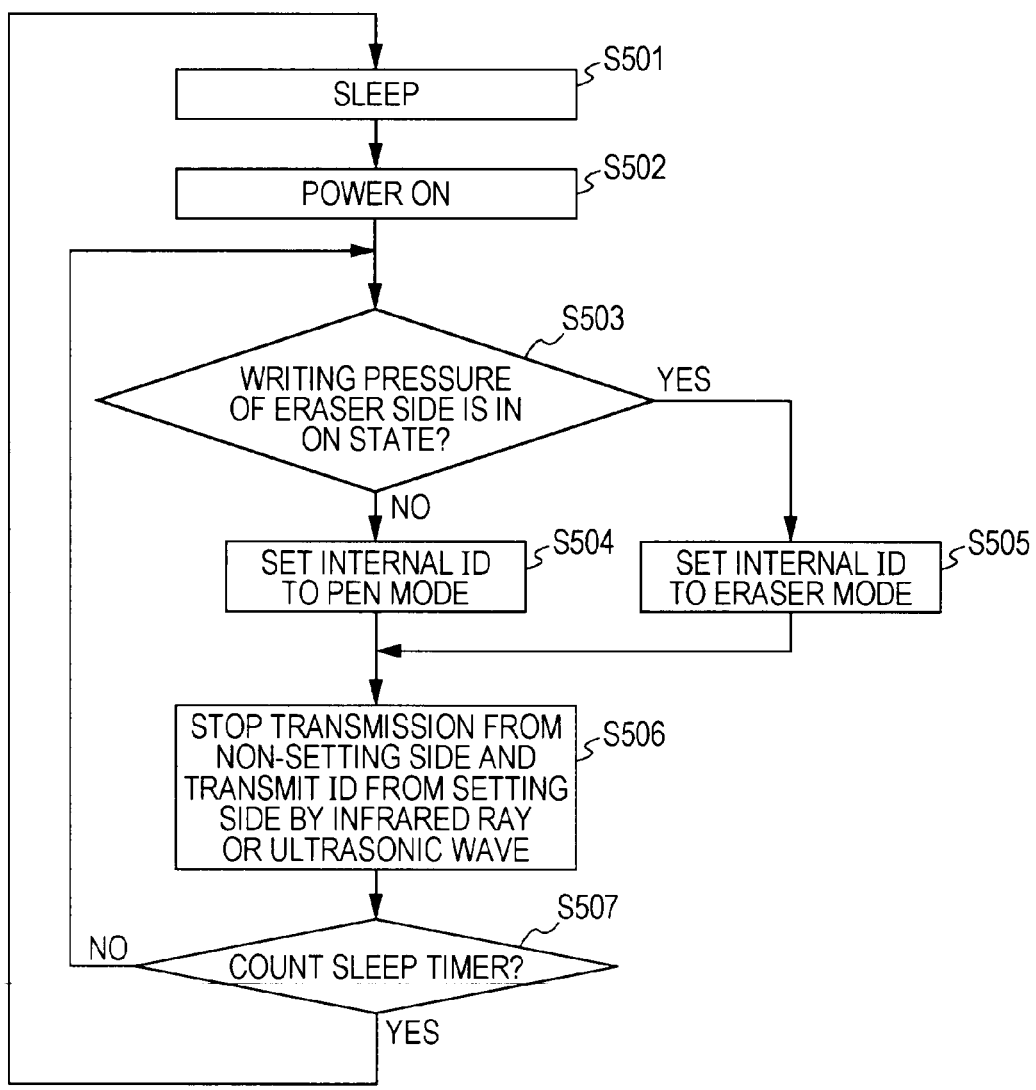
FIG. 25 is a flowchart illustrating the flow of a process executed by an electronic pen in the case where an eraser configuring a modification ID updating unit (a component for erasing handwriting data) is provided in the electronic pen, according to the same embodiment.

4-6. Process Executed by Electronic Pen in the Case where Eraser is Present on Electronic Pen FIG. 25 is a flowchart illustrating the flow of a process executed by an electronic pen in the case where an eraser configuring a modification ID updating unit (a component for erasing handwriting data) is provided in the electronic pen, according to the fourth embodiment of the present invention. The process executed by the electronic pen in the case where the eraser configuring the modification ID updating unit (the component for erasing handwriting data) is provided in the electronic pen, according to the same embodiment will be described with reference to FIG. 25.

As shown in FIG. 25, first, in a sleep state (step S501), the power of the electronic pen 100D is turned on by manipulation or the like from the user (step S502). The electronic pen 100D determines whether or not writing pressure of the eraser 130D side is On (step S503). The electronic pen 100D sets an internal ID to a pen mode (step S504) and progresses to step S506, if it is determined that the writing pressure of the eraser 130D side is not On ("No" in step S503). The electronic pen 100D sets the internal ID to an eraser mode (step S505) and progresses to step S506, if it is determined that the writing pressure of the eraser 130D side is On ("Yes" in step S503). The internal ID corresponds to the modification ID stored by the modification ID storage unit 140 of the above example.

Next, the electronic pen 100D stops the transmission of the infrared rays and the ultrasonic waves of the side which is not set, and transmits the ID from the side which is set by the infrared rays or the ultrasonic waves (step S506). The ID may be transmitted to the receiver 200 by means other than the infrared rays or the ultrasonic waves, as described above. The ID is an example of the modification ID. The electronic pen 100D counts a timer for going into the sleep state (step S507), returns to step S501 if it is determined that time-out has been generated ("Yes" in Step S507) and returns to step S503 if it is determined that time-out has not been generated ("No" in step S507).

Figure 26:
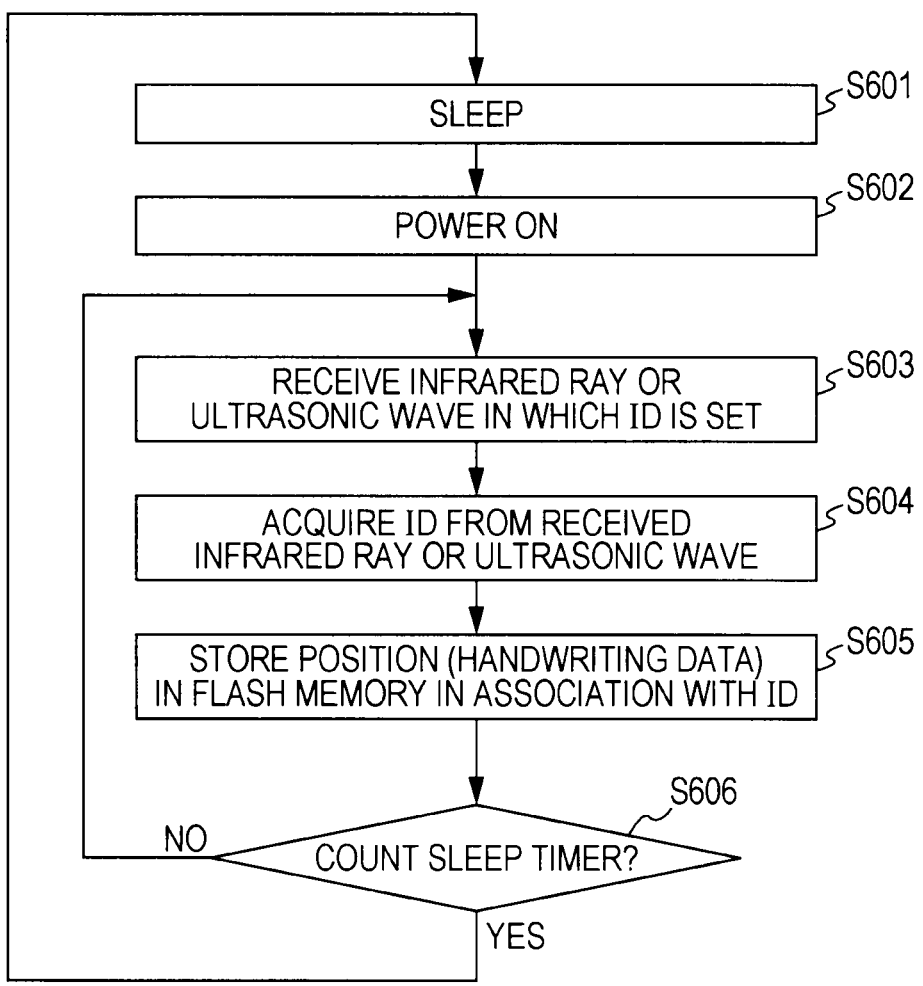
FIG. 26 is a flowchart illustrating the flow of a process executed by a receiver in the case where an eraser configuring a modification ID updating unit (a component for erasing handwriting data) is provided in an electronic pen, according to the same embodiment.

4-7. Process Executed by Receiver in the Case where Eraser is Present on Electronic Pen FIG. 26 is a flowchart illustrating the flow of a process executed by a receiver in the case where an eraser configuring a modification ID updating unit (a component for erasing handwriting data) is provided in an electronic pen, according to the fourth embodiment of the present invention. The process executed by the receiver in the case where the eraser configuring the modification ID updating unit (the component for erasing handwriting data) is provided in the electronic pen, according to the same embodiment will be described with reference to FIG. 26.

As shown in FIG. 26, first, in a sleep state (step S601), the power of the receiver 200 is turned on by manipulation or the like from the user (step S602). The receiver 200 receives the infrared rays or the ultrasonic waves in which a color ID is set (step S603) and acquires the color ID from the received infrared rays or ultrasonic waves (step S604). The color ID is an example of the modification ID.

Next, the receiver 200 stores a position (handwriting data) in the flash memory (an example of the storage unit 260) in association with the ID (step S605). The receiver 200 counts a timer for going into the sleep state (step S606), returns to step S601 if it is determined that time-out has been generated ("Yes" in Step S606) and returns to step S603 if it is determined that time-out has not been generated ("No" in step S606).

5. Fifth Embodiment

Case where Information Processing Device Erases Handwriting Data

Subsequently, a fifth embodiment of the present invention will be described. In the fifth embodiment of the present invention, the information processing device erases handwriting data. In the fifth embodiment of the present invention, the update processing unit 360 determines whether or not a predetermined mark is present in positional information based on the positional information stored by the storage unit 330. The update processing unit 360 specifies an ID for identifying erasing of the positional information defined by the predetermined mark as a modification ID, if it is determined that the predetermined mark is present. As the predetermined mark, as described in the third embodiment, various shapes (a notched bracket, an ellipse, a rectangle, and the like) may be considered.

5-1. Step of Erasing Handwriting Data by Information Processing Device (Method 1)

FIG. 27 is a diagram illustrating a step (method 1) of erasing handwriting data by an information processing device according to a fifth embodiment of the present invention. The step (method 1) of erasing handwriting data by the information processing device according to the same embodiment will be described with reference to FIG. 27.

As shown in FIG. 27, in the case where a portion is generated in which there is a desire to erase handwriting data while the user performs handwriting using the electronic pen 100, for example, the portion is enclosed by a bracket. The bracket may have any shape. Then, the position of a notched bracket [ ] or a round bracket ( ) is recognized by the function of the information processing device 300 and a minimum rectangle including the bracket is specified as an area to which the modification ID indicating the color white will be added. In addition, handwriting belonging to the area is erased (modified to white) and displayed by the information processing device 300.

5-2. Step of Erasing Handwriting Data by Information Processing Device (Method 2)

FIG. 28 is a diagram illustrating a step (method 2) of erasing handwriting data by an information processing device according to the fifth embodiment of the present invention. The step (method 2) of erasing handwriting data by the information processing device according to the same embodiment will be described with reference to FIG. 28.

As shown in FIG. 28, the user may enclose a portion, in which there is a desire to erase handwriting data, by a rectangle instead of a bracket. Then, the position of the rectangle is recognized by the function of the information processing device 300 and a minimum rectangle including the rectangle is specified as an area to which the modification ID indicating the color white will be added. In addition, handwriting belonging to the area is erased (modified to white) and displayed by the information processing device 300.

5-3. Step of Erasing Handwriting Data by Information Processing Device (Method 3)

FIG. 29 is a diagram illustrating a step (method 3) of erasing handwriting data by an information processing device according to the fifth embodiment of the present invention. The step (method 3) of erasing handwriting data by the information processing device according to the same embodiment will be described with reference to FIG. 29.

As shown in FIG. 29, the user may trace letters with respect to letters where there is a desire to erase handwriting data. Then, the letters traced by the user are recognized by the function of the information processing device 300 and the letters are erased (modified to white) and displayed.

5-4. Process Executed by Information Processing Device

Figure 30:
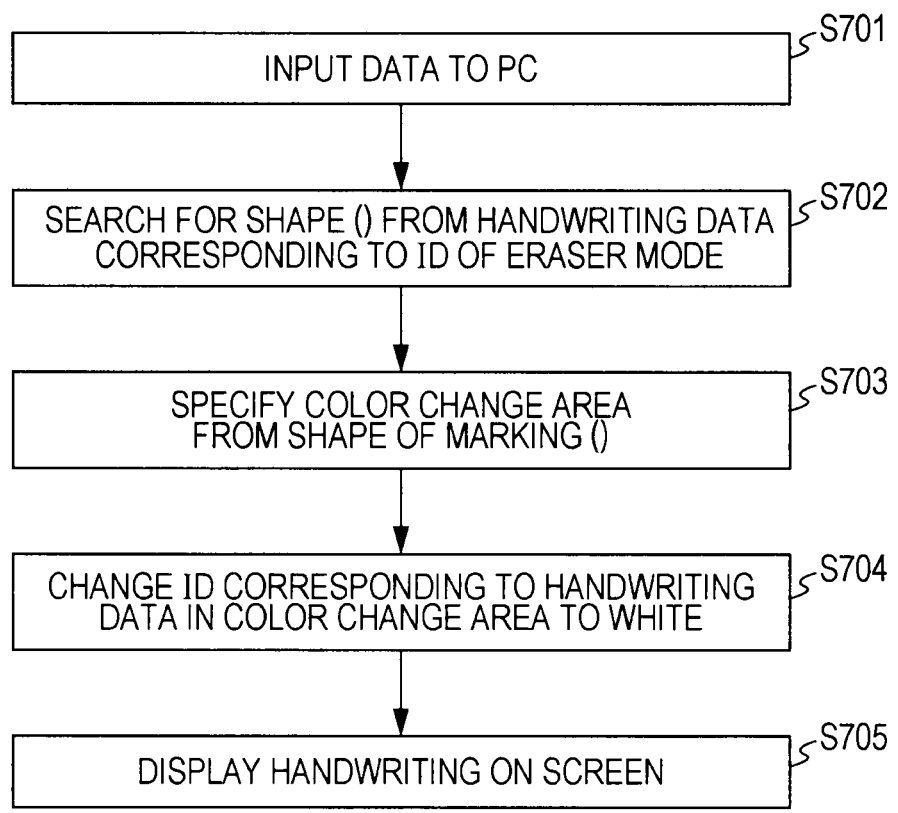
FIG. 30 is a flowchart illustrating the flow of a process of erasing handwriting data by an image processing device according to the same embodiment.

FIG. 30 is a flowchart illustrating the flow of a process of erasing handwriting data by an image processing device according to the fifth embodiment of the present invention. The process of erasing handwriting data by the information processing device according to the same embodiment will be described with reference to FIG. 30.

As shown in FIG. 30, first, data is input to the information processing device 300 (step S701). The information processing device 300 searches for the shape of a bracket from handwriting data corresponding to the ID of the eraser mode (step S702), specifies a color change area from the shape of the marking of the bracket (step S703), changes an ID corresponding to handwriting data in the specified color change area to white (step S704). Next, the information processing device 300 displays handwriting on a screen based on the handwriting data and the ID (step S705).

6. Modified Example

Although the suitable embodiments of the present invention are described in detail with reference to the accompanying drawings, the present invention is not limited to the embodiments. It will be apparent by those skilled in the art that various modification or changes can be made without departing from the technical scope of claims and also belong to the technical scope of the present invention.

7. Overview

According to the present embodiment, the user may modify handwriting data in a step of inputting handwriting data using an electronic pen. To this end, it is possible to solve a problem of imposing a burden on the user because the user has to remind themselves of the modification of the handwriting data, which is determined by the user in the step of inputting the handwriting data, after the handwriting data is input to the PC. A user, who feels that operating a PC is troublesome, is inconvenienced by the operation for modifying handwriting data after the handwriting data is input to the PC. In particular, classification of an image editing in the PC imposes a burden on the user even when a mouse operation is performed. According to the present embodiment, such problems are solved.

In addition, in the method of changing the modification ID by touching the partition provided on the dedicated paper using the electronic pen or specifying the modification ID change area by the information processing device, hardware does not have to newly be added in the electronic pen or the receiver. Accordingly, it is possible to perform a modification operation with low cost.

The present application contains subject matter related to that disclosed in Japanese Priority Patent Application JP 2009-283184 filed in the Japan Patent Office on Dec. 14, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
   an electronic pen to input data;
   a position detection unit configured to detect a position of a pen tip of the electronic pen and to acquire positional information indicating the position of the pen tip of the electronic pen;
   a modification ID storage unit configured to store a modification ID for identifying modification to the data at the position indicated by the positional information;
   a modification ID updating unit configured to update the modification ID;
   a reception device including a storage unit and a registration processing unit configured to register the modification ID stored by the modification ID storage unit and the positional information acquired by the position detection unit in the storage unit as associated information; and circuitry configured to analyze the positional information acquired by the position detection unit and to enable the modification ID updating unit to (1) update the modification ID by a first modification ID when the circuitry determines that the positional information indicates that the position of the pen tip of the electronic pen is in a first predetermined partition, and (2) update the modification ID by a second modification ID when the circuitry determines that the positional information indicates that the position of the pen tip of the electronic pen is in a second predetermined partition, wherein the first predetermined partition and the second predetermined partition are on a paper, and the circuitry determines whether the positional information indicates that the position of the pen tip of the electronic pen is in the first predetermined partition or the second predetermined partition based on the positional information after a correction indicator, which is different from the first predetermined partition and the second predetermined partition, on the paper is touched by the electronic pen, the correction indicator being not for updating the modification ID.

2. The information processing system according to claim 1, wherein the modification ID storage unit and the modification ID updating unit are included in the electronic pen.

3. The information processing system according to claim 2, wherein, when a button provided on a surface of the electronic pen is included and the button is pressed by a user, the modification ID updating unit updates the modification ID by an ID corresponding to the pressed button.

4. The information processing system according to claim 2, wherein, when a slide provided on a surface of the electronic pen is included and the slide is moved by a user, the modification ID updating unit updates the modification ID by an ID corresponding to a position to which the slide is adjusted after movement.

5. The information processing system according to claim 2, wherein, when a rotation adjustment unit rotated by twisting the electronic pen is included and the rotation adjustment unit is rotated by a user, the modification ID updating unit updates the modification ID by an ID corresponding to a position to which the rotation adjustment unit is adjusted after rotation.

6. The information processing system according to claim 1, wherein the modification of the position indicated by the positional information indicates a color used to color the position when the position indicated by the positional information is displayed on a display or is printed on paper.

7. The information processing system according to claim 1, wherein the modification ID storage unit and the modification ID updating unit are included in the reception device.

8. The information processing system according to claim 2, wherein:

when a pressure sensor provided on an end opposite to the pen tip of the electronic pen is included and pressure is detected by the pressure sensor, the modification ID updating unit updates the modification ID by an ID corresponding to the end opposite to the pen tip of the electronic pen, and the position detection unit detects the position of the end opposite to the pen tip of the electronic pen and acquires the positional information indicating the position of the end opposite to the pen tip of the electronic pen as the positional information.

9. The information processing system according to claim 1, wherein the position detection unit is included in the electronic pen.

10. The information processing system according to claim 1, wherein the position detection unit is included in the reception device.

11. An information processing system comprising:

an electronic pen to input data;

a position detection unit configured to detect a position of a pen tip of the electronic pen and to acquire positional information indicating the position of the pen tip of the electronic pen;

a modification ID storage unit configured to store a modification ID for identifying modification to the data at the position indicated by the positional information;

a modification ID updating unit configured to update the modification ID;

a reception device including a storage unit, a registration processing unit configured to register the modification ID stored by the modification ID storage unit and the positional information acquired by the position detection unit in the storage unit as associated information, and a transmission unit configured to transmit the associated information;

an information processing device including a display unit, a reception unit configured to receive the associated information transmitted from the reception device, and a control unit configured to perform modification indentified by the modification ID at the position indicated by the positional information with respect to the associated information received by the reception unit and to display the associated information on the display unit; and circuitry configured to analyze the positional information acquired by the position detection unit and to enable the modification ID updating unit to (1) update the modification ID by a first modification ID when the circuitry determines that the positional information indicates that the position of the pen tip of the electronic pen is in a first predetermined partition, and (2) update the modification ID by a second modification ID when the circuitry determines that the positional information indicates that the position of the pen tip of the electronic pen is in a second predetermined partition, wherein the first predetermined partition and the second predetermined partition are on a paper, and the circuitry determines whether the positional information indicates that the position of the pen tip of the electronic pen is in the first predetermined partition or the second predetermined partition based on the positional information after a correction indicator, which is different from the first predetermined partition and the second predetermined partition, on the paper is touched by the electronic pen, the correction indicator being not for updating the modification ID.

12. An information processing system comprising:

an electronic pen to input data;

a reception device including a position detection unit configured to detect a position of a pen tip of the electronic pen and to acquire positional information indicating the position of the pen tip of the electronic pen and a transmission unit configured to transmit the positional information detected by the position detection unit;

an information processing device including a storage unit, a reception unit configured to receive the positional information transmitted from the reception device, a control unit configured to store the positional information received by the reception unit in the storage unit, and an update processing unit configured to specify a modification ID for identifying modification to the data at the position indicated by the positional information based on the positional information stored by the storage unit, to specify a modification ID change area which is an area to which the modification ID is added, and to add the specified modification ID to the positional information of the specified modification ID change area; and circuitry configured to analyze the positional information acquired by the position detection unit and to enable the update processing unit to (1) update the modification ID by a first modification ID when the circuitry determines that the positional information indicates that the position of the pen tip of the electronic pen is in a first predetermined partition, and (2) update the modification ID by a second modification ID when the circuitry determines that the positional information indicates that the position of the pen tip of the electronic pen is in a second predetermined partition, wherein the first predetermined partition and the second predetermined partition are on a paper, and the circuitry determines whether the positional information indicates that the position of the pen tip of the electronic pen is in the first predetermined partition or the second predetermined partition based on the positional information after a correction indicator, which is different from the first predetermined partition and the second predetermined partition, on the paper is touched by the electronic pen, the correction indicator being not for updating the modification ID.

13. The information processing system according to claim 12, wherein the update processing unit determines whether or not a predetermined mark is present in the positional information based on the positional information stored by the storage unit, and specifies an ID for identifying a color added to a position defined by the predetermined mark as the modification ID if it is determined that the predetermined mark is present.

14. The information processing system according to claim 12, wherein the update processing unit determines whether or not a predetermined mark is present in the positional information based on the positional information stored by the storage unit, and specifies an ID for identifying erasing of positional information defined by the predetermined mark as the modification ID if it is determined that the predetermined mark is present.

15. The information processing system according to claim 1, wherein the circuitry determines whether the positional information indicates that the position of the pen tip of the electronic pen is in the first predetermined partition or the second predetermined partition based on displacement information of a first displacement of the first predetermined partition from the correction indicator and a second displacement of the second predetermined partition from the correction indicator.

* * * * *